Nov. 24, 1953
R. F. BROUSSARD ET AL
2,660,283
PARKING METER
Filed Feb. 2, 1950
10 Sheets-Sheet 6
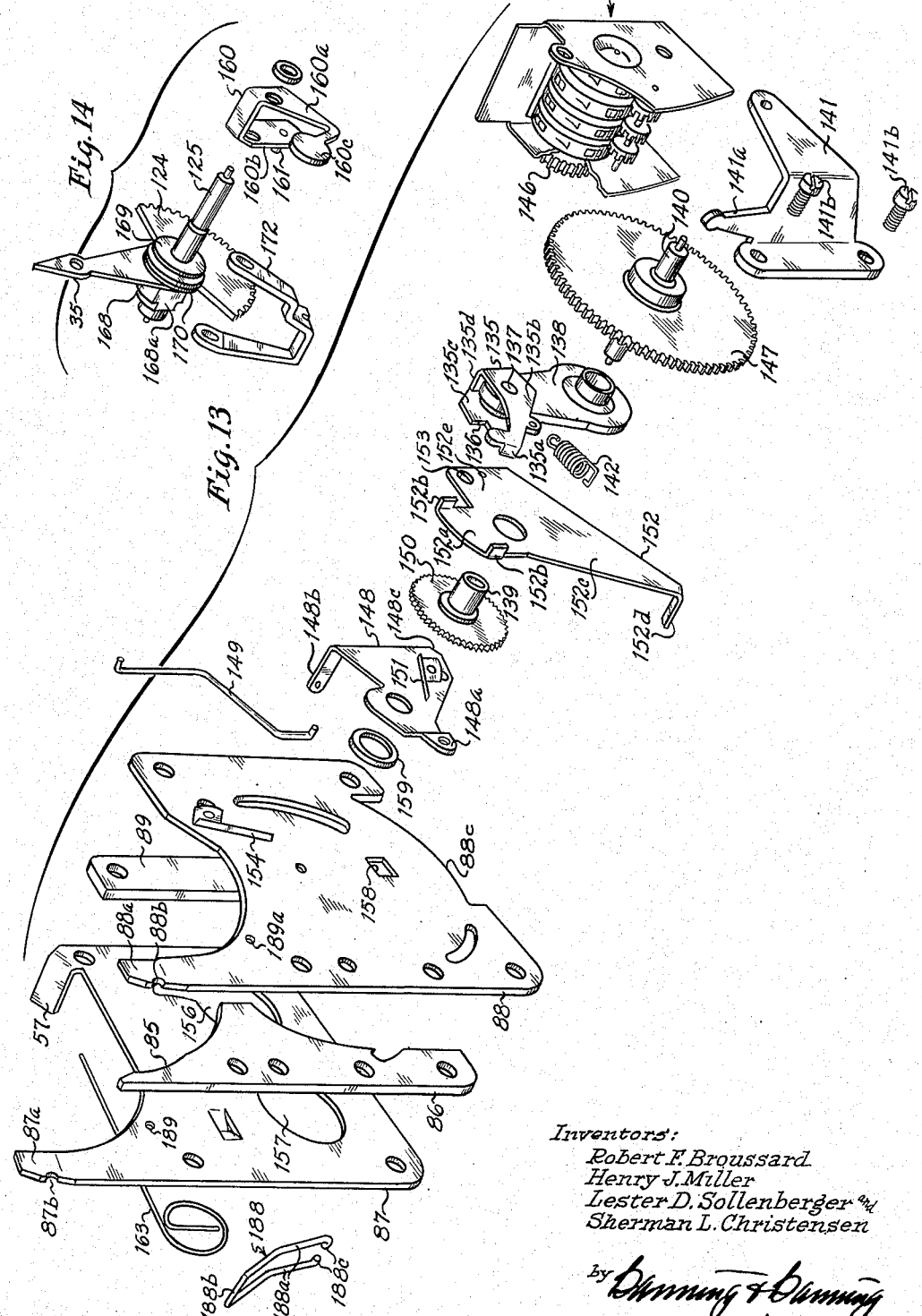
Inventors:
Robert F. Broussard
Henry J. Miller
Lester D. Sollenberger
Sherman L. Christensen
by Dunning & Dunning
Attorneys Nov. 24, 1953  R. F. BROUSSARD ET AL  2,660,283
PARKING METER
Filed Feb. 2, 1950  10 Sheets-Sheet 7

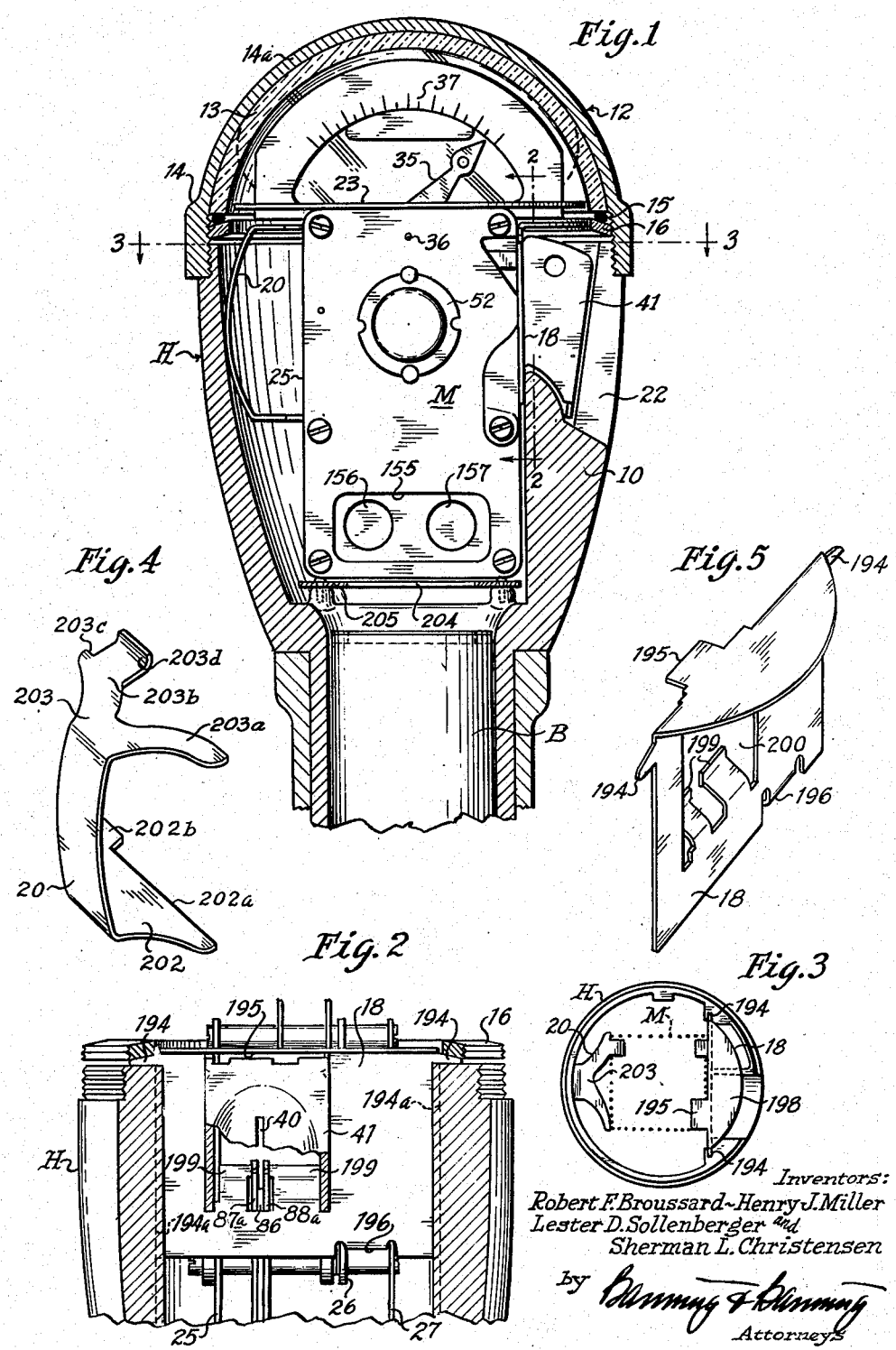

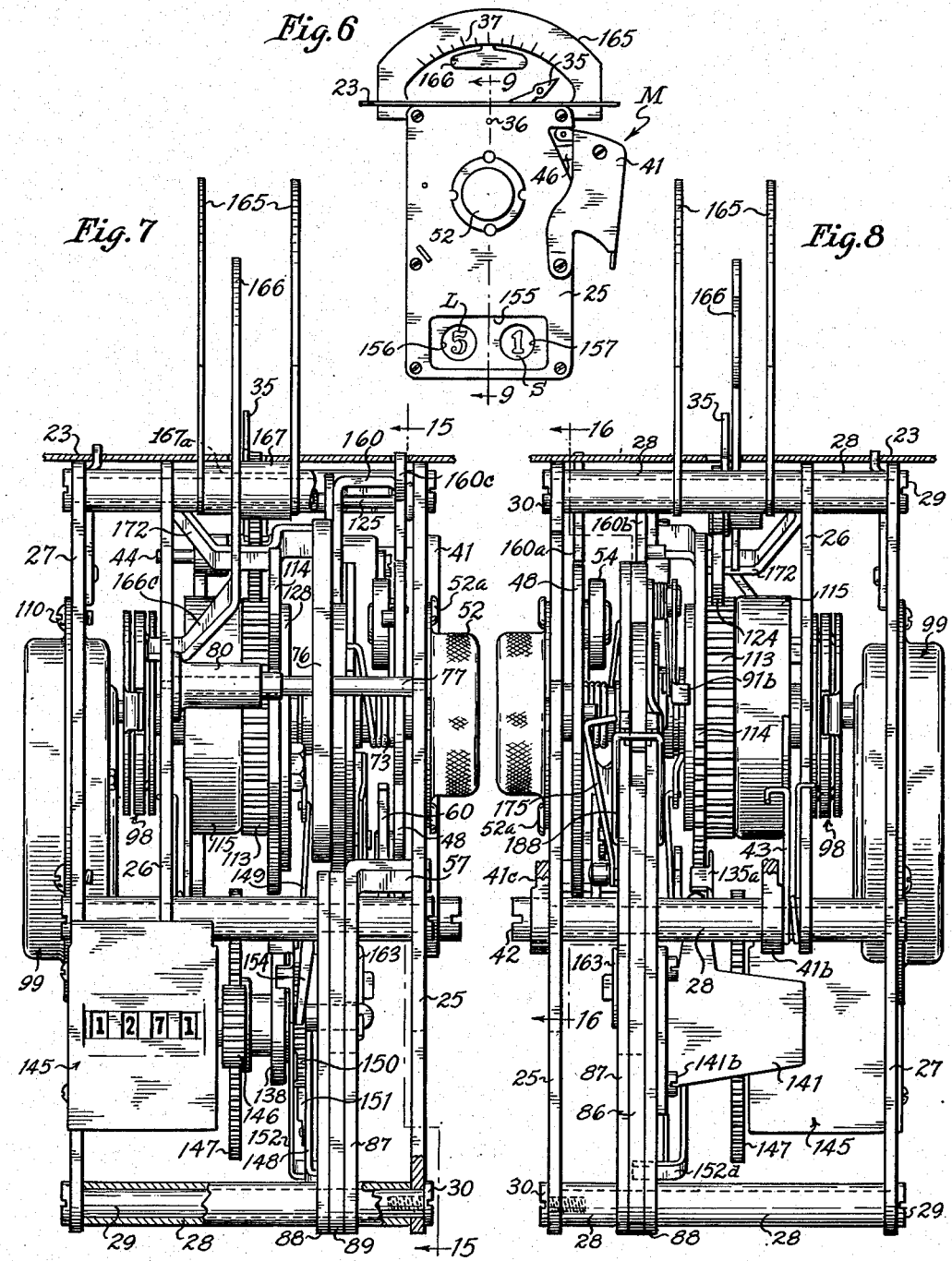

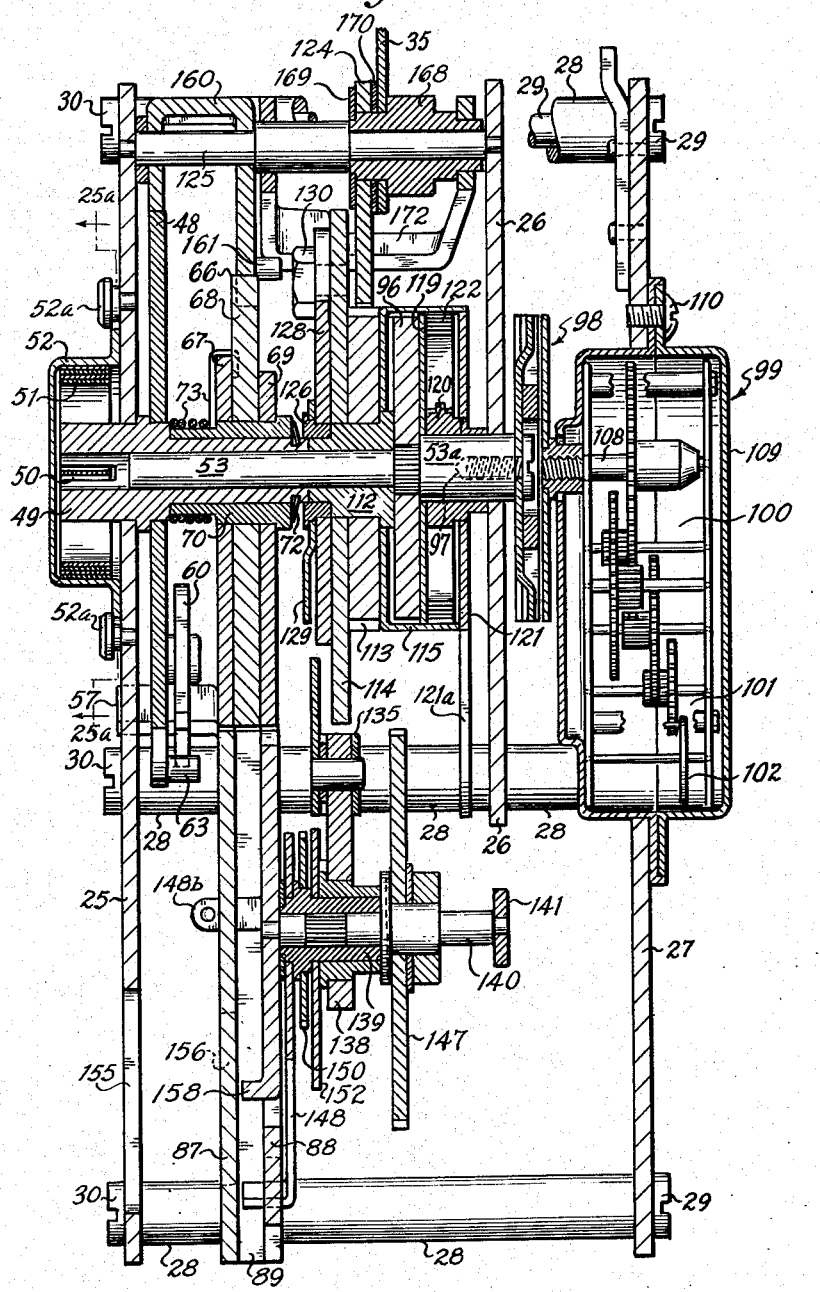

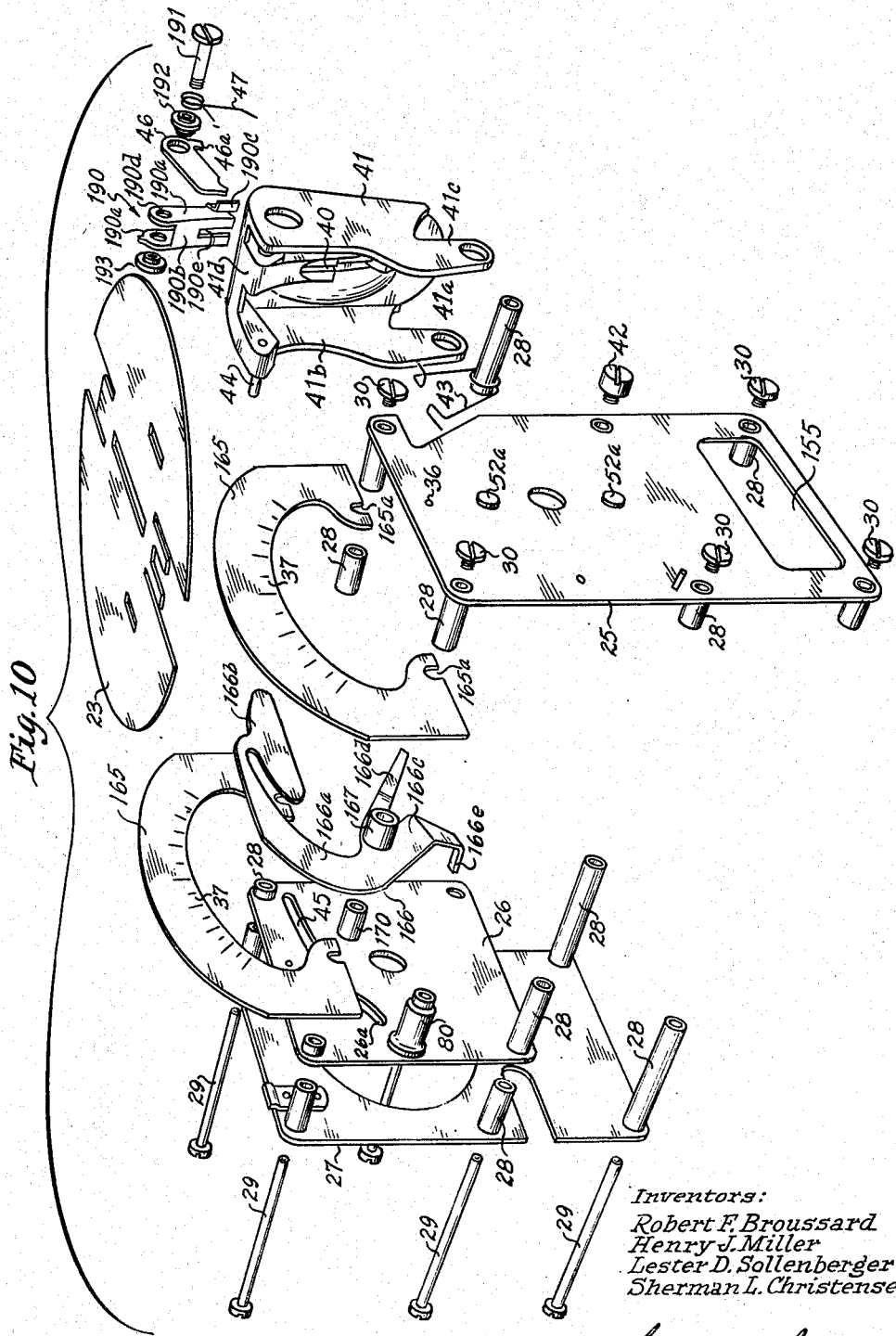

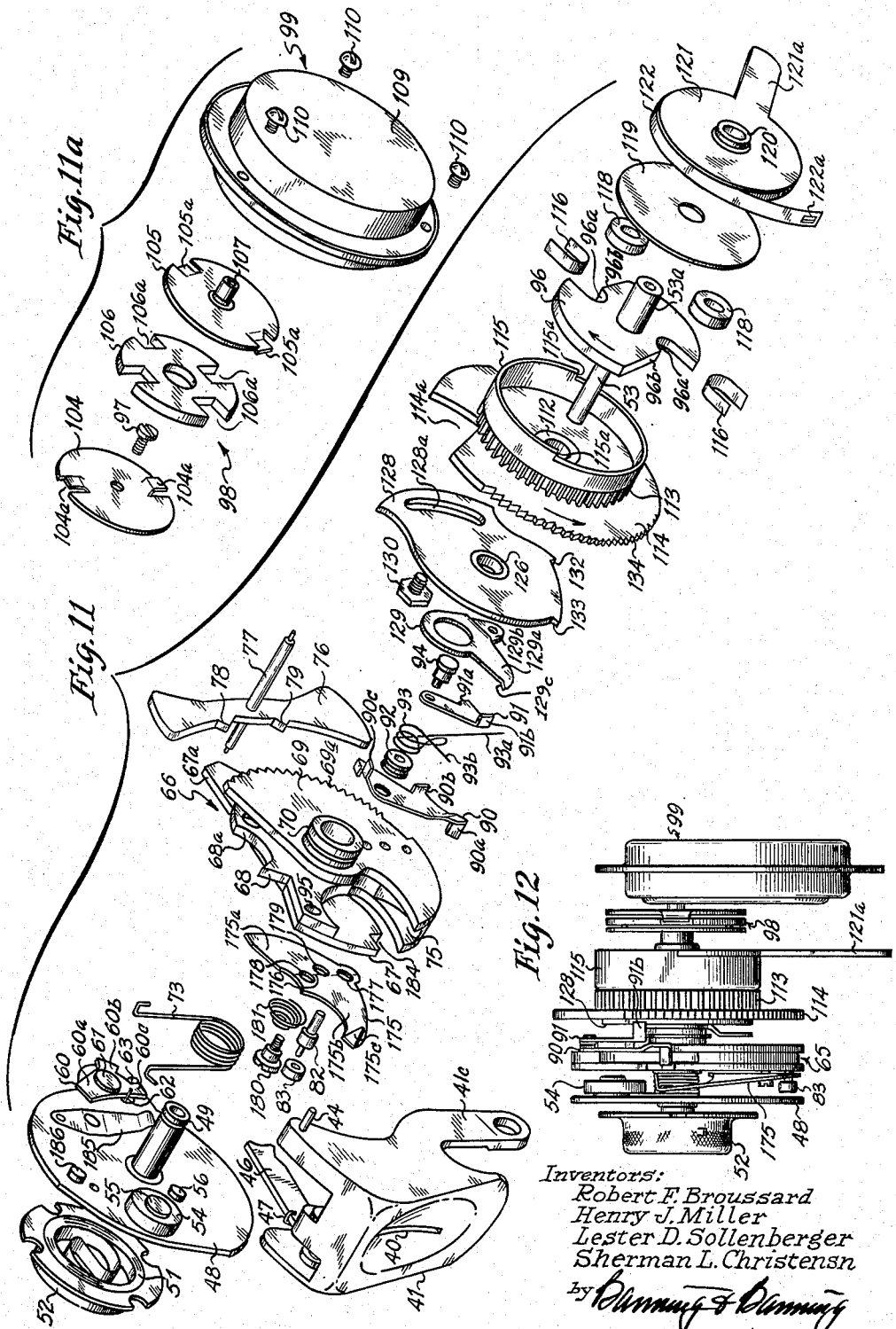

Inventors:
Robert F. Broussard
Henry J. Miller
Lester D. Sollenberger and
Sherman L. Christensen by Banning & Banning
Attorneys Nov. 24, 1953   R. F. BROUSSARD ET AL   2,660,283
PARKING METER
Filed Feb. 2, 1950   10 Sheets-Sheet 8

Inventors:
Robert F. Broussard
Henry J. Miller
Lester D. Sollenberger and
Sherman L. Christensen by Banning & Banning
Attorneys Nov. 24, 1953  R. F. BROUSSARD ET AL  2,660,283
PARKING METER
Filed Feb. 2, 1950  10 Sheets-Sheet 9

Inventors: *Robert F. Broussard* ~ *Henry J. Miller*
*Lester D. Sollenberger* and *Sherman L. Christensen*

Attorneys

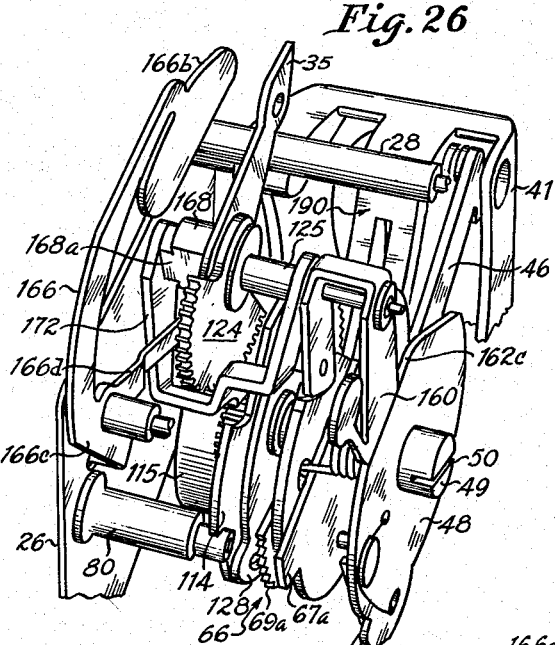
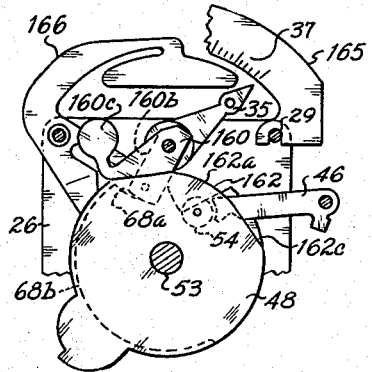
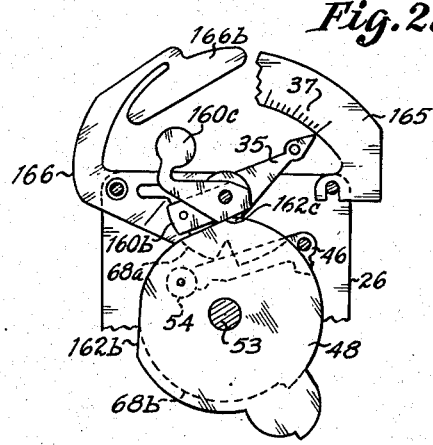
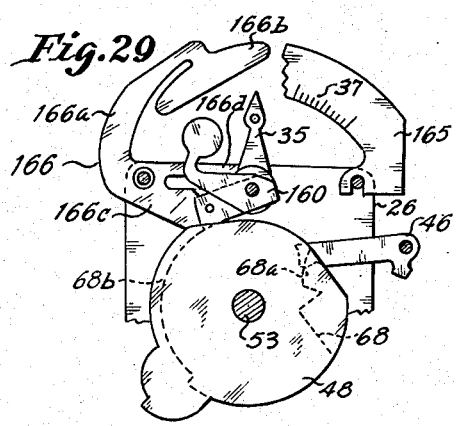
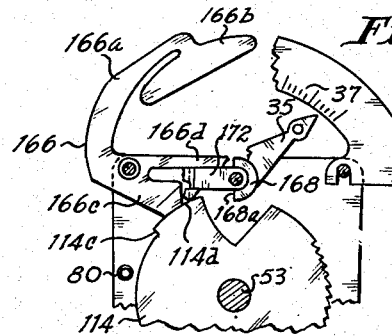
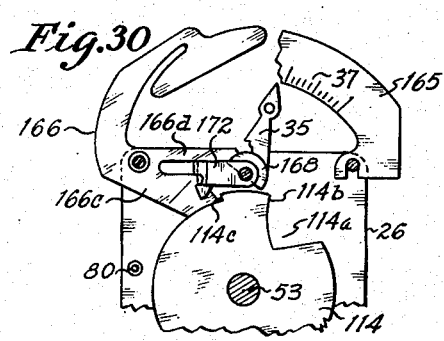
Inventors:
Robert F. Broussard
Henry J. Miller
Lester D. Sollenberger and
Sherman L. Christensen Patented Nov. 24, 1953

2,660,283

UNITED STATES PATENT OFFICE 2,660,283

PARKING METER

Robert F. Broussard, Burbank, Calif., Henry J. Miller and Lester D. Sollenberger, Chicago, Ill., and Sherman L. Christensen, Los Angeles, Calif., assignors, by mesne assignments, to Miller Meters, Inc., Chicago, Ill., a corporation of Illinois Application February 2, 1950, Serial No. 142,042

15 Claims. (Cl. 194—72)

This invention relates to coin-controlled devices and more particularly to a parking meter having a coin mechanism which utilizes a manual coin inductor in conjunction with a movable coin carrier and other associated parts as hereinafter specified, all assembled within a unitary supporting structure which is adapted for securement in a fixed position within a protecting housing therefor.

The features of this invention are directed largely to certain safeguards by which to prevent vandalism and to circumvent illicit practices which aim at obtaining parking time without payment of the prescribed tolls. This invention is also directed to various and sundry mechanical features which improve the operation of a coin mechanism of the general kind described.

Many parking meters are susceptible of being jammed and thus rendered temporarily inoperative. This may be done in some cases by inserting two coins consecutively in the coin-receiving slit, without depressing the manually operable meter-setting element after insertion of the first coin and prior to insertion of the second. It is accordingly one of the major objects of this invention to provide means effective to prevent jamming of the meter mechanism as a result of any attempt to force two coins into the meter without intermediately actuating the coin carrier comprised in the mechanism.

Another object is to prevent effective operation of the meter through the use of apertured slugs, such as washers, in the place of genuine coins. A further object is to provide a signal which will serve to announce, whenever such is the fact, that the meter is out of order by reason either of the power mechanism, or the coin carrier being jammed in an off-normal position, thus enabling the officer on duty to at once detect and report the trouble and thereby minimize the periods during which the meter is not properly functioning.

Still another object is to provide means effective to firmly anchor the meter mechanism within the housing therefor so that it is positioned to function properly while at the same time being easily and quickly removable and replaceable, thereby greatly expediting maintenance.

An additional object is to simplify and improve the motion-imparting connection between the manually operable meter-setting element and the power mechanism by eliminating gears which have previously been employed for this purpose, and substituting a direct connection in place thereof, thus materially reducing friction loss and rendering the meter easier to operate while at the same time reducing parts and assembling costs.

A further object is to prevent cheating of the meter through unauthorized use of two coins in such manner as to obtain a major unit of parking time in exchange for one minor coin. Another object is to prevent operation of the coin carrier and resultant setting of the meter without expenditure of a coin—a performance which, if successful, would involve use of two or more coins while at the same time retrieving all the coins so employed.

A still further object is to prevent manipulation of the meter in such a way as to obtain parking time on the indicator scale without withdrawing the violation flag from the visible position in which it indicates a condition of overtime—a manipulation which heretofore has been possible for the purpose either of disparaging use of the parking meters or of causing embarrassment to the attending officers.

An additional object is to eliminate the need for certain extremely narrow manufacturing tolerances which it has heretofore been necessary to maintain in order to enable the meter to distinguish with certainty between major and minor coins. Still another object is to provide an improved coin gauge which is especially suited for use in meters designed to afford two major units of parking time in exchange for two major coins.

Other objects will be pointed out or will become self-evident as the ensuing description proceeds. The accompanying drawings (10 sheets) illustrate a suggestive embodiment of this invention in the manner following:

Figure 1 is a vertical sectional view of the parking meter housing together with a front elevational view of the self-contained parking meter mechanism in its normal position within the housing;

Fig. 2 is a sectional view, taken at line 2—2 of Fig. 1, showing in elevation the locating plate which serves, in co-operation with other parts, to fix the position of the meter mechanism unit within the housing and to aid in securing the same in place, subject to intentional withdrawal;

Fig. 3 is a plan view on a reduced scale, taken at line 3—3 of Fig. 1, and showing more particularly the position of the meter mechanism within the housing and the vertical grooves or guide-slots designed to receive the locating plate;

Fig. 4 is a perspective view of a removable spring metal keeper which normally functions conjointly with the locating plate of Fig. 5, to locate and secure the meter mechanism in place within the housing;

Fig. 5 is a perspective view of the locating plate for the meter mechanism;

Fig. 6 is a small scale front elevation of the meter mechanism, exclusive of the housing;

Fig. 7 is an enlarged side elevation of the meter mechanism as viewed from the left of Fig. 6;

Fig. 8 is an enlarged side elevation of the meter mechanism as viewed from the right of Fig. 6 (being the reverse of Fig. 7), the manually operable coin inductor being omitted from this view in order to expose other parts located at the rear thereof;

Fig. 9 is an enlarged section, taken on line 9—9 of Fig. 6;

Fig. 10 is an exploded view showing the framework of the meter mechanism and the graduated time scales or dial plates, together with a few mechanical parts including the violation flag and the manually operable coin inductor by means of which the meter is manually set for operation coincidentally with the deposit of a coin;

Figure 15:
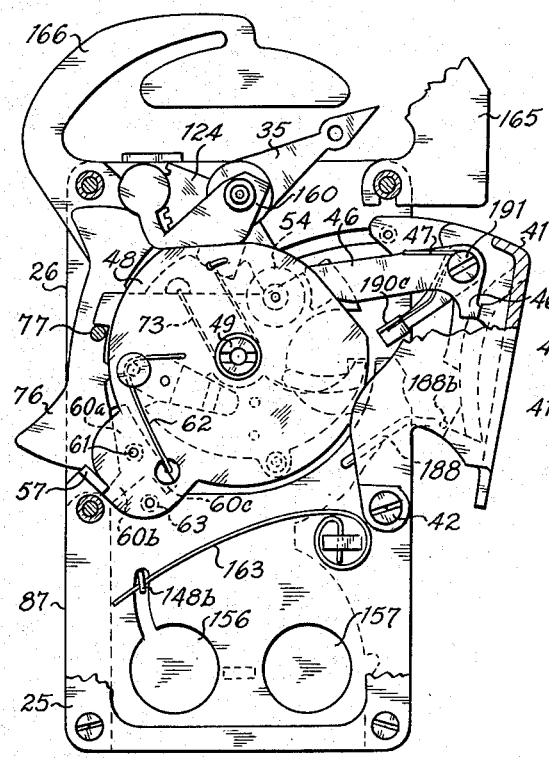
Figure 16:
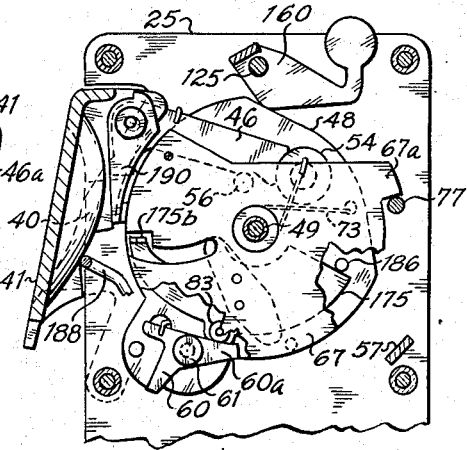
Figure 17:
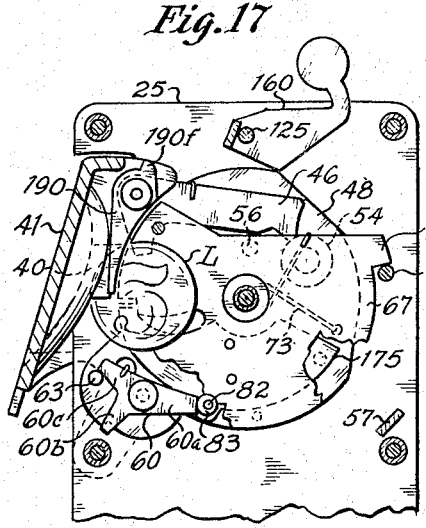
Figure 18:
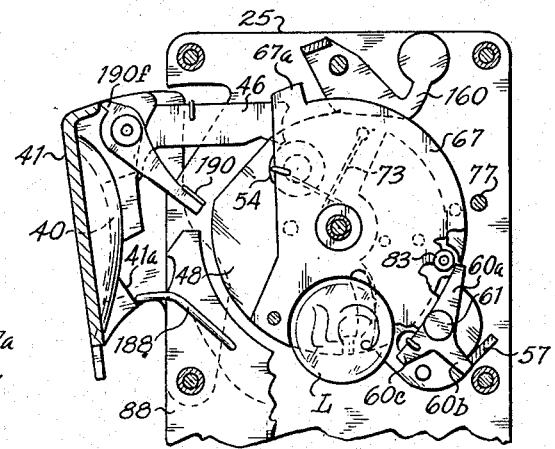
Figure 21:
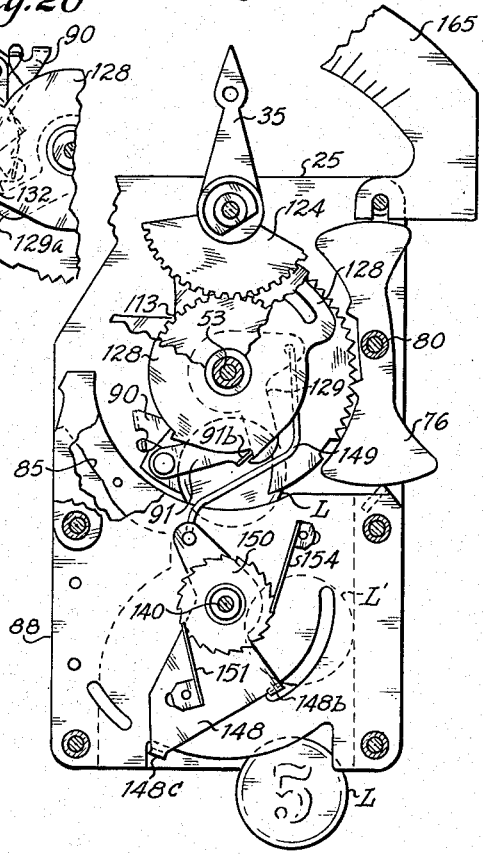
Figure 22:
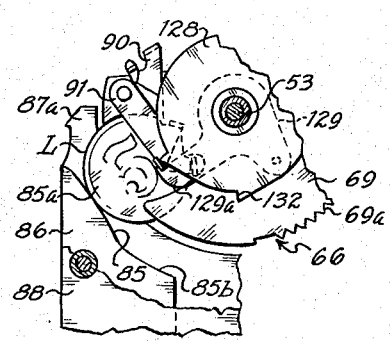
Figure 23:
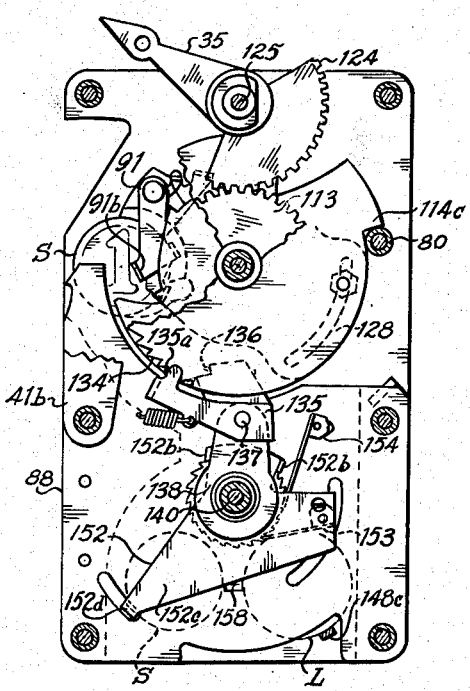
Figure 25:
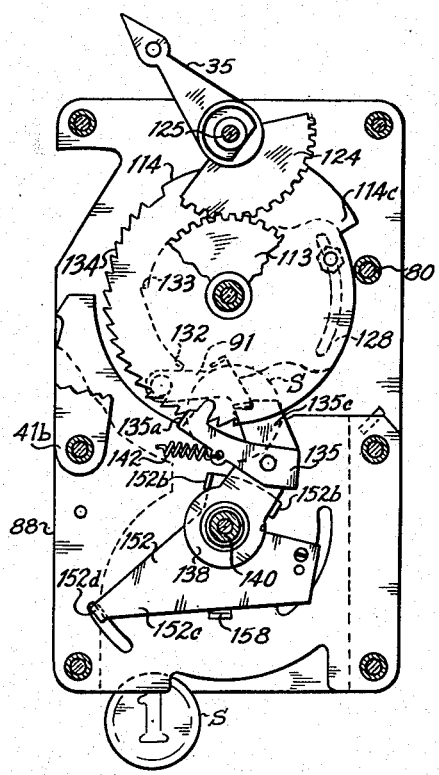
Figure 24:
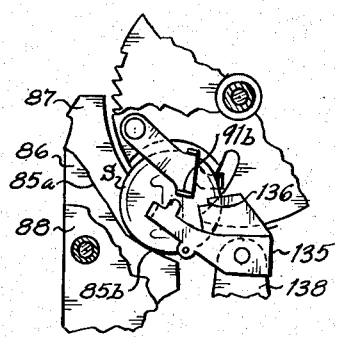
Figure 25A:
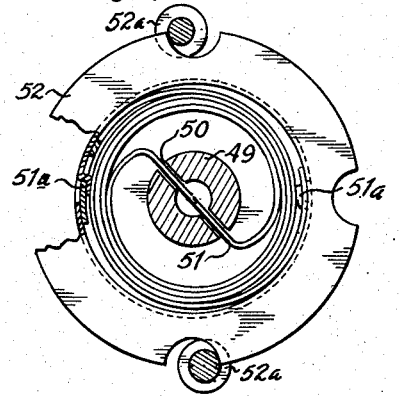

Figs. 11 and 11a, taken together, constitute an exploded view of the mechanical components of the meter mechanism which, for the most part, are located on or immediately associated with what will be referred to as the major axis, Fig. 11a being a continuation of Fig. 11;

Fig. 12 is an assembly of the parts shown in Figs. 11 and 11a;

Fig. 13 is an exploded view showing, in perspective, a group of parts which for the most part are located at a lower level than those shown in Figs. 11, 11a and 12, and comprising the plates forming the coin track, the coin-release mechanism, the coin counter and the pawl which advances the time-setting plate in response to a minor coin;

Fig. 14 is an exploded view showing in perspective the time-indicating pointer and certain associated parts, together with the trouble flag and a yoke which serves as a coupling medium between the trouble flag and the violation flag;

Fig. 15 is a sectional view, taken at line 15—15 of Fig. 7, showing the several exhibited parts in their normal positions;

Fig. 16 is a sectional view, taken at line 16—16 of Fig. 7, showing the manually operated coin inductor in a partially depressed position and the power plate in a corresponding position;

Fig. 17 is a view similar to Fig. 16, showing the coin inductor in fully depressed position and the power plate in its extreme off-normal position wherein it is latched to the coin carrier and about to return to normal position, thus rotating the coin carrier from coin-receiving to coin discharge position;

Fig. 18 is a view similar to Figs. 16 and 17, showing the manually operated coin inductor and the power plate restored to normal position and illustrating how the latch is de-actuated to allow the coin carrier to return to its normal position, a major coin being shown in process of being discharged from the coin carrier into the coin chute;

Figs. 19–22 inclusive are views designed to illustrate progressively the manner in which the timing mechanism is set for operation in response to a major coin, Fig. 22 being intended to illustrate a special situation which often arises where the meter is adapted to afford two major units of parking time in exchange for two major coins, and where the second major coin is inserted in the coin slot just prior to expiration of one such unit of time;

Figs. 23–25 inclusive are views designed to illustrate progressively the manner in which the timing mechanism is set for operation in response to a minor coin, Fig. 24 being intended to illustrate how the difference in diameter between a major and a minor coin is accentuated by altering the contour of the coin track;

Fig. 25a is a detail in section, taken on line 25a—25a of Fig. 9;

Fig. 26 is a fragmentary perspective view of the upper portion of the meter mechanism; and Figs. 27–31 inclusive are a series of semi-diagrammatic views illustrating progressively the operation of the trouble flag and the violation flag.

*Preliminary explanation of the subject parking meter and statement of invention*

The specific parking meter chosen for illustration and description is susceptible of operation with coins of two different denominations, viz., coins of two different diameters, as for example nickels and pennies. The coin of larger diameter is referred to herein as a major coin whereas the coin of small diameter is referred to as a minor coin. The meter is designed to receive a maximum of two major coins, or one major coin and five minor coins, or ten minor coins, and to afford proportionate parking time; but none of the novel features of the invention is limited in its utility to meters answering to the above description.

The entire meter installation herein chosen by way of example comprises a metal housing mounted on a hollow post within which is a removable coin box, and a self-contained unitary meter mechanism mounted for easy removal within the housing. The present application is concerned principally but not entirely with the meter mechanism per se.

The major components of the illustrated meter mechanism itself are:

A. A power mechanism including a rotary power plate, a power spring rotationally biasing the power plate toward a normal position, a latch carried by the power plate and operative to releasably couple the power plate to the coin carrier, a manually operable element for energizing and setting the meter and constituting a coin inductor which may take the form of a pivoted arm or push plate having a coin slit through which coins are admitted to the coin carrier, and a pusher link hinged to the manually operable element and operative upon depression of said element for rotating the power plate from its normal position to an alternative position wherein the power plate is latched to the coin carrier.

B. A coin carrier designed to receive coins, one at a time, as they are passed through the coin slit of the coin inductor and which is rotatable by the power mechanism from a normal coin-receiving posture to an alternate coin-discharge position, and mounting a spring-biased coin gauge which is movable in response to a major coin to a predetermined position in which it is effective upon rotation of the coin carrier to set the time indicator for a period corresponding to the value of the major coin (usually one hour) and movable in response to a minor coin to a different predetermined position in which it is effective upon rotation of the coin carrier to set the time indicator for a shorter period proportionate to the value of the minor coin.

C. Time indicating means in the form of a graduated scale on a dial plate, and a time indicator or pointer co-operating with the scale and spring-biased toward the zero scale indicia, but movable along the scale in response to coin-controlled actuation of the meter to an extent corresponding to the value of the deposited coin.

D. A timing regulator or brake in the form of a gear train and escapement which functions to retard the return movement of the time indicator.

E. A coin counting mechanism which registers in accordance with the value of each deposited coin and thus provides a cumulative record of receipts.

F. A coin release mechanism which operates to arrest each coin in registration with an observation window and thereafter releases the arrested coin when another coin of the same denomination is inserted in the meter.

To set the meter for obtainment of parking time, the motorist inserts either a major coin or a minor coin in the coin slit and simultaneously exerts pressure against the manually operable coin inductor in which the coin slit is formed; and he may, if he desires, insert two major coins or any number of minor coins up to the value of two major coins and thus obtain the maximum allowable parking time or any desired proportionate part thereof. He must, however, actuate the coin inductor after each insertion of a single coin because the coin carrier is not designed to receive more than one coin at a time.

When, after inserting a proper coin, the customer depresses the manually operable inductor plate, he causes the power plate to rotate from a normal at-rest position to an alternate position and at the same time energizes a power spring which functions to return the power plate to its normal position. When the power plate reaches its alternate position, a latch carried thereby engages the coin carrier and couples the same to the power plate so that, upon the return rotation of the power plate under the impetus of the power spring, it carries with it the coin carrier and thus rotates the coin carrier from its coin-receiving position to the coin-discharge position. As soon as the coin carrier reaches the coin-discharge position, the coin carrier is released and a biasing spring connected thereto returns the coin carrier to its coin-receiving position where it is ready to receive another coin. During rotation of the coin carrier away from its coin-receiving position, it carries with it either a major or minor coin which is held in place by a stationary coin track along which the coin rolls or slides; and the coin gauge is at the same time held by the coin in an offnormal position corresponding to the diameter of the coin. If the coin is a major one, the coin gauge is so positioned thereby that it engages a tooth on a time control plate and is thereby effective to move the time indicator through a major angular distance in response to rotation of the coin carrier while the latter is moving from coin-receiving to coin-discharge position. If the coin is a minor one, the coin gauge is so positioned thereby that it does not engage the time control plate tooth but, instead, engages and actuates a pawl which, in turn, engages and rotates a ratchet wheel and thereby effects rotation of the time indicator to an extent corresponding to the value of a minor coin. In either event, the time indicator is moved away from its zero position against the opposition of a restoring spring which immediately becomes effective to move said indicator toward the zero position at a rate determined by the timing regulator.

While the illustrated meter mechanism is designed to afford a maximum of two major units of parking time (usually two hours) in exchange for two major coins (nickels) or ten minor coins (pennies), it can easily be converted so that it is capable of being set to afford a maximum of one major unit of parking time. The duration of one major unit of time ordinarily is one hour, but that is determined by the time regulator which can be designed either to increase or decrease the interval required for the time indicator to scan the graduated scale.

It is unfortunately the fact that parking meters are among the favorite targets of vandals, and practical experience with parking meters has brought to light certain vulnerabilities which such persons have been able to discover, and to the curing of which the present invention is in part directed.

In the absence of effective counter provision, it is possible in some parking meters to insert a minor coin in the coin slit and then, through the use of a second coin flip the first coin upwardly, causing it to escape the coin carrier and sometimes get into a position where it will jam the mechanism. The perpetrators of such a scheme obtain no parking time but they do discredit the parking meters so put out of order. One of the features of this invention consists in the provision of a spring-biased arm pivotally connected to and carried by the manually operable coin inductor and operative as a barrier against upward diversion of inserted coins while at the same time being yieldable to permit unhampered movement of the coin inductor.

With some parking meters it has also been found possible to obtain a major unit of parking time in exchange for a minor coin by partially depressing and holding the manually operable coin inductor while inserting a minor coin in the coin slit and then pushing the minor coin into the coin carrier by means of a second coin, and thereafter fully depressing the coin inductor. The result of such a manipulation is to cause the first-inserted minor coin to displace the coin gauge to an extent equal to the displacement thereof normally effective by a major coin. The present invention defeats any such fraudulent operation through the provision of a barrier which normally does not interfere with insertion of a coin into the coin slit, but which does change its position as the manually operable coin inductor is depressed so as to prevent insertion of a second coin at a time when it would be possible by so doing to accomplish the purpose intended. If the two coins are inserted while the coin inductor remains in a non-depressed position, the barrier will eject the second coin and thus thwart the fraudulent attempt.

Another point of vulnerability present in certain prior parking meters is that, through the conjoint use of two coins, it is possible to displace the coin gauge and rotate the coin carrier sufficiently to obtain several minutes of parking time, and then retrieve both coins—the power mechanism being still unactuated. Such an attempt may be successfully defeated through the provision of a locking mechanism which prevents rotation of the coin carrier from its coin-receiving position until just prior to the instant when the power plate commences its return stroke, whereupon the coin carrier is unlocked so that it is free to follow the power plate. There is so little margin between the release of the coin carrier and the commencement of its rotation by the power plate that for all practical purposes it is virtually impossible to unlock the coin carrier by depressing the coin inductor without also causing the power mechanism to rotate the coin carrier; and even if such a delicate manipulation might occasionally be successfully performed, it could rarely, if ever, be done while at the same time attempting to rotate the unlocked coin carrier through the use of two coins, in the manner above related.

In earlier meter constructions the brass plates which form the two sides of the coin track, and which are spaced apart to provide an interior coin slot leading into the coin carrier, are susceptible of being forced apart to such an extent that it is possible to jam two minor coins therebetween, and thus put the meter out of working order until it is cleared by a service man. Resort to the use of heavier plates or reinforcements therefor to overcome this difficulty has not been practicable for various reasons. In the present mechanism the problem has been solved by providing the meter-locating plate with a pair of laterally spaced rigid fingers which function when the locating plate is in position to reinforce the brass plates which form sides for the coin track. This renders it impossible to press two minor coins into the interior coin slot, thereby avoiding the possibility of coin jams at this point.

The most usual way of defrauding parking meters and other coin-controlled mechanisms is through the use of slugs, and the most readily available slugs are usually apertured iron or brass washers which can easily be obtained in suitable diameters and thicknesses. A feature of the present invention is the novel device which obstructs full rotation of the power plate and thus prevents release of the coin carrier in response to insertion of an apertured washer therein. While operation of the meter by means of imperforate slugs is not prevented, the meters are rendered incapable of operation with what is by far the most easily obtainable form of slug having suitable dimensions.

Another feature of the present invention resides in the provision of a trouble flag which operates upon failure of either the power plate or the coin carrier to move to normal position, thus serving to inform service personnel that the associated meter requires attention.

With meters of prior construction designed to receive both major and minor coins, where the difference of diameters is small, extreme precision is required in certain parts in order to enable the responsive mechanism to distinguish between the two denominations. The present invention embraces a novel feature which eliminates the need for such close tolerances. This consists in the simple expedient of changing the contour of the coin track so as to increase its radial distance from the axis of rotation of the coin carrier within the sector occupied by a minor coin when the coin gauge encounters the pawl which functions to rotate the time control plate in response to deposit of a minor coin. The portion of the coin track which determines the effect of the deposited major coin remains unchanged.

In certain meter constructions the manually operable coin inductor is connected to the power mechanism through the agency of gears which serve to effect a reversal of direction and at the same time an increase in the rotative movement of the manually operable element. An important feature of the present invention is the elimination of all such gears with resultant smoother and easier operation as well as a substantial saving in production cost.

Still another feature of this invention is an improvement in the arrangement for operating the violation flag. In the prior constructions the violation flag has been directly actuated by the manually operable coin inductor, whereas in the present construction it is actuated only indirectly in response to depression thereof and in such a way that it is not possible to put time on the meter without withdrawing the violation flag and keeping it withdrawn until the purchased parking time has expired. It has been possible, upon deposit of either a major or minor coin, to so manipulate the manually operable coin inductor that the meter can be set without moving the violation flag to a concealed position: in the case of a major coin, operation of the violation flag has been produced by depressing the manually operable coin inductor slowly and then releasing it slowly, after hearing the latch click and before the trip is released; and in the case of a minor coin a like result has been achieved by quickly releasing the coin inductor after depressing the same. Although the perpetrator cannot thereby obtain unpaid-for parking time, the violation flag is maintained in an exposed position to annoy the attending officer and also to disparage parking meters generally, or a given product in particular, as might best accord with his sinister purpose.

Where a parking meter of the type here dealt with is adapted to be set so as to afford two major units of parking time in exchange for two major coins, it sometimes happens that a customer will deposit a major coin at a time when the meter shows nearly a whole major unit of unexpired time; and when that situation arises the coin gauge is apt to strike the tip of one of the teeth of the time control plate, or to strike the time control plate at a point near the tip of the tooth, for which reason a one-piece coin gauge will not yield sufficiently to permit complete entry of a major coin into the coin carrier. And if the customer should try to force the coin into the meter he probably would damage the coin gauge to such an extent that it might require replacement. A feature of the present invention is the remedy provided for such a condition, viz., a two-piece coin gauge which is yieldable to permit insertion of a major coin without damage to itself.

Still another feature resides in a novel and effective provision for locating and removably anchoring the meter mechanism within the housing therefor. Servicing operations are thereby facilitated and reduced to a virtual minimum of time for the removal or replacement of the meter mechanism, while at the same time insuring accurate location of the meter mechanism so that it will function properly and dependably.

*General description with reference to the drawings*

The parking meter installation herein disclosed comprises a housing H supported on a suitable post (not shown), a meter mechanism M, and a removable coin box B which is positioned below the meter mechanism. A coin-receiving slot is provided in the coin box at its upper end, in register with a coin-discharge opening in the bottom of the meter mechanism, to receive therefrom both major and minor coins as they descend by gravity.

The housing H comprises a hollow body 10 which preferably is an aluminum casting, and a removable cover 12 including a transparent hemispherical dome 13, preferably plastic, and a metal retainer 14 which serves to hold the dome 13 in place and is threaded internally to detachably engage the housing body. The arched portion 14a of the dome 13 is a relatively narrow bridge and does not enclose the dome or interfere with essential visibility therethrough of the graduated time scale and indicator, nor of the trouble and violation flags. An annular gasket 15 is held against the peripheral edge of the dome 13 by means of a ring 16 which is threaded into the retainer 14, thus rendering the housing weathertight.

The meter mechanism M is a self-contained unit which can be withdrawn bodily from the housing H, after first removing the dome 13, and it is appropriately located and removably held in place within the housing by means of a locating or positioning plate 18 (see Fig. 5), and a keeper 20 (see Fig. 4). Some of the novel features of the present invention involve the locating plate 18 and the keeper 20, concerning which a detailed description will be given at a later point. The locating plate 18 serves, among other purposes, in co-operation with the keeper 20, to so position the meter mechanism that a manually operable element, constituting a coin inductor, in which is included a coin-receiving slit, registers with an opening 22 through the wall of the housing body 10, and at the same time functions to align the coin-discharge opening in the bottom of the meter mechanism with the coin-receiving opening in the top of the coin box B, the object being to expedite servicing of the meters by making it possible for authorized employees to remove and replace the meter mechanism quickly and without exercise of special skill. A circular plate 23 supported on the frame of the meter mechanism M serves to conceal from view the apparatus therebelow, and provides a conspicuous surface for display of relevant parking regulations such as the hours during which parking tolls are required to be paid, and the prevailing exceptions.

All the component parts of the meter mechanism are supported, directly or indirectly, by an articulated framework comprising primarily three laterally spaced plates 25, 26 and 27, a number of tubular spacers 28, a number of tie bolts 29 which pass through the plates and the spacers, and a number of screws 30 which are threaded into the ends of the tie bolts 29. The exploded perspective view of Fig. 10 shows the configurations of the three frame plates and serves, in conjunction with Figs. 7–9, to clarify the construction of the framework. For convenience, we may refer to the plate 25 as the front plate, to the plate 27 as the back plate, and to the plate 26 as the intermediate plate.

Unused parking time is shown by a time indicator in the form of a pointer 35 having an axis of rotation at 36 (see Figs. 1 and 6), and a graduated scale 37 which, for present purposes, may be considered as calibrated for two major units of time of one hour each. As viewed in Figs. 1 and 6, the zero indicia is at the right-hand end of the scale, and the indicator 35 moves counterclockwise when the meter is being set, and clockwise when the meter is running down. The opposite holds true when the meter is viewed from the other side. Setting of the meter is accomplished by inserting either a major or minor coin in the coin-receiving slit 40 and depressing the manually operable coin inductor 41 in which the coin-receiving slit 40 is formed.

The coin inductor 41 which may take the form of a push plate and is sometimes so referred to hereinafter, is a cast metal part comprising a finger-engaging bridge portion 41a interconnecting two laterally spaced parallel arms 41b and 41c each of which is apertured at its lower extremity to engage a fulcrum. The fulcrum to which the arm 41b is connected is one of the tubular spacers 28, and the fulcrum to which the arm 41c is connected is a screw 42 which latter is one of the group which includes the screws 30 but has an extra long head to afford an adequate heavy surface for the arm 41c (see Figs. 8 and 10). The push plate 41 is biased outwardly by a spring 43 and normally assumes the outward position in which it is shown in Figs. 1 and 6. A pin 44 (see Fig. 10), projecting laterally from one side of the coin inductor functions to limit the reciprocatory movement thereof in both directions, and for that purpose is extended through an arcuate slot 45 in the plate 26 (see Fig. 10).

A pusher link 46 is pivotally connected at one end to a lug 41d which forms an integral part of the coin inductor 41 (see Figs. 10 and 15), and normally assumes the approximately horizontal position in which it is shown in Fig. 15. This link serves as a power-transmitting medium between the coin inductor 41 and a so-called power mechanism, which latter is energized in response to each inward movement of the coin inductor and thereupon utilizes its stored energy to rotate a coin carrier, which, in turn, is effective to set a timing mechanism proportionately to the value of the deposited coin.

The power mechanism includes a power plate 48 (see especially Figs. 9 and 11) affixed to a sleeve 49 with which it is rotatable and which is diametrically slotted at 50 (see Figs. 9 and 25a) to engage the medial portion of a ribbon power spring 51 where it is reversed and wound into coils whose opposite ends are slotted for engagement by hooks 51a which are inset from a sheet metal housing 52 detachably connected with capacity for rotative adjustment to the outer surface of the front frame plate 25 with the aid of rivets 52a. A spring so formed is doubly effective for supplying the power desired for operation of the associated mechanism. The sleeve 49 is journaled in an opening in the plate 25 and, in turn, provides a bearing for a shaft 53 the function of which will later be explained.

A steel roller 54 is carried by a pin 55 which, in turn, is secured to one face of the power plate 48 at a point radially remote from its axis of rotation and is positioned for engagement by the free end of the pusher link 46 upon depression of the coin inductor 41. The free end of the pusher link is concaved to conform to the periphery of the roller 54 (see Fig. 15) and this link is also provided with a tailpiece 46a which normally bears against a boss on the coin inductor 41 so as to be held in the position of Fig. 15 wherein it is adapted to engage the roller 54. A spring 47 serves to bias the pusher link 46 downwardly toward the normal position in which it is shown in Fig. 15. As the coin inductor 41 is pressed inwardly, the pusher link 46 engages the roller 54 and thus rotates the power plate 48 and the sleeve 49 through a predetermined distance, thereby energizing the power spring 51 so that when the power plate is released it will return to its normal position under the impetus of this spring. The normal position of the power plate is determined by a stop 57 (see Fig. 15) which normally engages a shoulder on the power plate.

A latch 60 (see Fig. 11), carried by and rotatable on a pivot 61 secured to the power plate 48, is biased by a spring 62 in the clockwise direction as viewed in Fig. 15, and in the counterclockwise direction as viewed in Figs. 16–18 inclusive. This latch includes three radially projecting arms 60a, 60b and 60c (see Fig. 11). When the power plate is in its normal position (see Fig. 15) the arm 60b is pressed by the spring 62 against the stop 57; when, however, the power plate is moved away from the normal position of Fig. 15, the latch 50 is rotated by the spring 62 until the arm 60c is brought to bear against a stop pin 63 carried by and projecting laterally from the power plate. The function of the latch 60 will be explained in connection with a coin carrier 66 now to be considered.

The coin carrier is a self-contained subassembly and is shown most clearly, as an entirety, in Fig. 11. Many of the parts included in the coin carrier sub-assembly are separately shown in Fig. 11, it being impossible to illustrate clearly the entire assembled unit in a perspective view. The body of the coin carrier is identified as a whole by the reference numeral 66, and it consists principally of two outer plates 67 and 69 and an intermediate plate 68 fixedly secured together and rigidly mounted on a bushing 70 which is rotatable on the sleeve 49 forming part of the power mechanism (see Figs. 9 and 11). The sleeve 49 has an annular groove at its inner end for reception of a snap-on washer 72 which serves to hold the coin carrier in place on the sleeve 49. A coiled torsion spring 73 (see Fig. 11) is mounted on the bushing 70 (see Fig. 9), and has its two ends connected respectively to the power plate and to the plate 67 of the coin carrier. This spring serves to bias the coin carrier toward its normal coin-receiving position and consequently functions to return the coin carrier to that position after it has been rotated by the power mechanism to the coin-discharge position and then released. The three coin carrier plates 67, 68 and 69 are so contoured that they form conjointly a coin-receiving pocket 75 designed to receive both major and minor coins, one at a time. This pocket opens peripherally of the carrier at a location which registers with the coin-receiving slit 40 in the coin inductor, i. e., the push plate 41, when the coin carrier is in its normal coin-receiving position (see Figs. 11 and 15–17 inclusive).

If the coin carrier were unrestrained it would rotate under the impetus of the power spring 51 and, in the opposite direction, under the impetus of its restoring spring 73 (see Fig. 11) at excessively high speeds such that there would be no release of a minor coin from a rocker arm, and a faulty operation of a counter, both to be hereinafter described in detail. For these reasons means have been provided for retarding the rotation of the coin carrier in both directions. This consists of a somewhat massive rocker 76 mounted on a rocker-shaft 77 and provided with two escapement pallets 78 and 79 which engage a series of V-shaped teeth 69a on the periphery of the carrier plate 69 (see Fig. 11). The two ends of the rocker-shaft 77 are reduced to form trunnions which are journaled in openings provided therefor in the front and intermediate frame plates 25 and 26 (see Fig. 7). As the carrier rotates, the rocker 76 is oscillated by the alternate action of the teeth 69a on the pallets 78 and 79. The rotational inertia of the rocker 76 determines its oscillation period with respect to any assumed torsional force acting on the coin carrier; hence the speed of rotation of the coin carrier can be increased or decreased by proportionately increasing or decreasing the rotational inertia of the rocker 76.

The carrier plate 67 has a radially projecting arm 67a (see Fig. 11) which normally rests against the rocker shaft 77. A thimble 80 is attached to and projects laterally from the frame plate 26 (see Fig. 7), and is concentric with the rocker shaft 77. The arm 67a constitutes a stop means which determines the normal rotational position of the coin carrier wherein it is adapted to receive in its coin pocket 75 a coin which is passed thereto through the coin-receiving slit 40 of the inductor 41.

The carrier plate 67 has a laterally projecting pin 82 on which is mounted a small roller 83 which is in the path of the free end of the arm 60a of the latch 60 when the latter is so biased by the spring 62 (see Fig. 15) that its arm 60c rests against the stop pin 63 (see Fig. 17). When the power plate is being rotated away from its normal position of Fig. 15 toward the alternate rotative position shown in Fig. 16, the latch 60 is deflected rotationally, the camming action of the roller 83 bearing against the arm 60a, thus allowing the latch to escape said roller. Just before the power plate is released by disengagement of the roller 54 from the pusher link 46, and is about to return to its normal position under the impetus of the power spring 51, the free end of the latch arm 60a clears the roller 83 whereupon the latch 60 is rotated by its biasing spring 62 to a position wherein the arm 60c bears against the stop pin 63. As shown in Fig. 17, the free end of the arm 60a is in a position to drivably engage the roller 83, thus coupling the coin carrier to the power plate. Immediately after the latch 60 has assumed the position of Fig. 17, the power plate is released by an over-center movement of the pusher link 46 which is brought about by the action thereon of the pin 56 (see Fig. 16). During the return movement of the power plate the coin carrier is rotated bodily from its normal coin-receiving position to its alternate coin-discharge position as illustrated in Fig. 18. This movement of the coin carrier is effected by the power mechanism by virtue of the roller 83 being drivably engaged by the latch 60. While the coin carrier is being rotated from its normal coin-receiving position to its alternate coin-discharge position the power plate is rotating from its alternate position to the normal position thereof shown in Fig. 15. Upon near completion of the return movement of the power plate, the latch arm 60b strikes the stop 57, and the latch is thus rotated in a direction to release the roller 83, whereupon the coin carrier returns to its normal position under the impetus of its restoring spring 73 (see Fig. 17).

The coin in the pocket 75 of the coin carrier must be held in place while the carrier is rotating from its normal coin-receiving position to its alternate coin-discharge position, and yet in such a way that it will be quickly ejected when the coin carrier arrives at the coin-discharge position. Moreover the coin must be held at a predetermined distance from the center of rotation of the coin carrier, i. e., the major axis of the meter, so that it will, in turn, hold the coin gauge (to be hereafter described in detail) in a proper position so that the time indicator will be moved to an extent corresponding either to a major coin or a minor coin, depending upon which kind of coin has been deposited. To these ends there is provided a coin track partially encircling the coin carrier and constituting a curved coin-supporting surface 85 in line with the coin pocket 75 in the coin carrier body 66 and formed on one edge of a plate 86 (see Fig. 13) which is held between two additional plates 87 and 88 which together provide coin guide walls to prevent excessive lateral displacement of the coins as they proceed along the coin track. The three plates 86—88 are supported on some of the tie bolts 29 and jointly held in position laterally by certain of the tubular spacers 28. As shown in several of the figures (for example Fig. 22) the coin track 85 is spaced at some distance radially from the periphery of the coin carrier and is effective to hold the coin only partially extended into the coin carrier pocket.

The coin gauge

Referring now more particularly to Figs. 11 and 19–25, attention is directed to the so-called coin gauge whose primary function is to differentiate between major and minor coins and thus determine the extent to which the time indicator shall be rotatively displaced in response to each coin insertion and accompanying actuation of the push plate 41. In previous parking meters the coin gauge has consisted of a single spring-biased arm pivotally connected to and carried by the coin carrier, but here it consists, instead, of an assemblage comprising two arms (see Fig. 11) which are identified respectively by the reference numerals 90 and 91. The entire assemblage includes, additionally, a spool-like spacer 92 around which is coiled a wire spring 93, and a pin 94 which functions as a pivot and extends through apertures in each of the two arms and through the bore of the spacer 92. This pin is formed with an end portion of reduced diameter which passes through an opening 95 in the carrier body plates 67 and 68 and is staked at the end to effect a firm attachment to the carrier body. An edgewise view of the assembled coin gauge is shown in Fig. 8.

Figure 19:
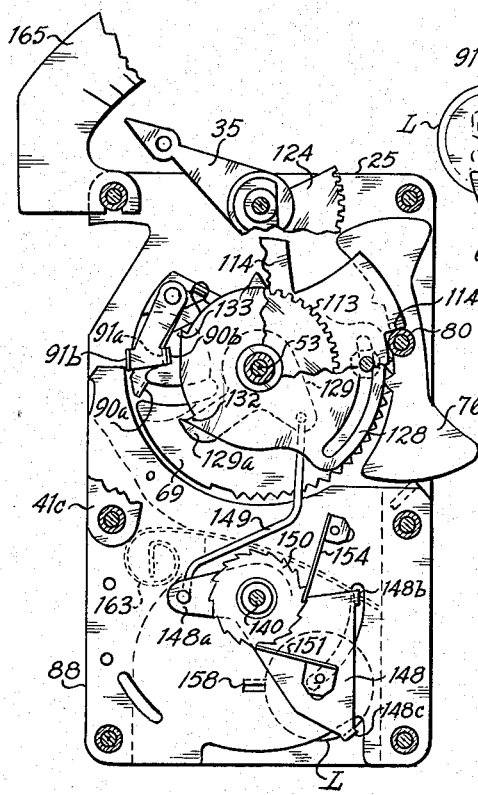
Figure 20:

The arm 90 has a laterally projecting finger 90a which is disposed within the coin pocket 75 in the path of the inserted coin, and a second laterally projecting finger 90b designed to cooperate with a complementary finger 91a on the arm 91, the latter overlapping the finger 90b in the manner shown in Figs. 11 and 19. The spring 93 bears at its end 93a against the periphery of the projecting end of the bushing 70 from whence it extends upwardly around the spool 92 in the counterclockwise direction as viewed in Fig. 19, thence around a lug 90c on the arm 90 in the counterclockwise direction, and thence again around the spool 92, but in the clockwise direction. The opposite end 93b of the spring bears against the finger 91a. With this spring arrangement, involving as it does only one spring, the arm 90 is biased outwardly so that the finger 90a normally assumes a position adjacent the periphery of the coin carrier (see Fig. 19) while the arm 91 is biased in the opposite direction. When the finger 90a is pressed inwardly of the coin carrier the arm 90 will rotate in the counterclockwise direction, as viewed in Fig. 19, and the arm 91 will at the same time rotate in the same direction, due to its spring bias. Since the only force tending to rotate the arm 91 in the counterclockwise direction is that exerted by the spring 93, the arm 90 is accordingly free to rotate counterclockwise independently of the arm 91 if anything should interfere with rotation of the latter arm in that direction. Under certain conditions there may be interference with rotation of the arm 91 in the counterclockwise direction as viewed in Fig. 19, hence the use of two arms 90 and 91 instead of a single arm as heretofore.

The time indicator setting mechanism and timing gear train or brake

The shaft 53 (see Fig. 9) whose axis of rotation coincides with the major axis of the meter mechanism is journaled in the intermediate frame plate 26 as well as in the sleeve 49, and fixedly secured to this shaft is a disc-like member 96 which constitutes the driven element of a unidirectional clutch through whose agency the shaft is rotatable only in one direction. The direction of such rotation is indicated by the arrow on the member 96 in Fig. 11 or in the counterclockwise direction as viewed from the coin carrier. Attached to the end of the shaft 53 adjacent the intermediate frame plate 26 by means of a left-hand screw 97 is a flexible coupling 98 which, in turn, is connected to the driving shaft of a brake mechanism 99 comprising a gear train 100 together with an escapement 101 and a balance wheel 102. The brake mechanism 99 which is a self-contained unit of familiar construction is detachably mounted on the rear frame plate 27. Its function is to regulate the rate of return of the time indicator 35, and it is capable of adjustment by altering the tension of a hair spring in generally the same way that an ordinary timepiece is adjusted. The coupling 98 includes a driving disc 104, a driven disc 105, and an intermediate disc 106 interposed between the driving and driven discs and having four peripheral notches 106a arranged in quadrature and engaged by laterally projecting ears 104a and 105a formed on the driving and driven discs, respectively (see Fig. 11a). Such a coupling will operate satisfactorily even when there is some axial misalignment of the main shaft and brake mechanism, and so is advantageous on this account. The driven disc 105 is provided with a central hub 107 which is internally threaded to engage the correspondingly threaded end of a driven shaft 108 constituting part of the brake mechanism 99 (see Fig. 9). The entire brake mechanism, including the driven shaft 108, is enclosed within a sheet metal housing 109 which is detachably secured to the rear frame plate 27 by means of three screws 110. By virtue of the coupling 98, the brake mechanism 99, together with the driven disc 105, is immediately withdrawable upon removal of the three screws 110. Replacement of the brake mechanism, in event of trouble therewith, can consequently be effected in a minimum of time.

A sleeve 112 (see Fig. 9) loosely mounted on the shaft 53 has affixed to it a spur gear 113, a ratchet wheel 114, and a cup-like sheet metal housing 115 which latter encloses the clutch disc 96 and serves as the driving member of the clutch. The clutch disc 96 (see Fig. 11) is provided with two diametrically opposite notches 96a, each designed to receive a U-shaped leaf spring 116; and this disc is further cut away to form at opposite sides of its axis of rotation two parallel chord surfaces 96b each forming a track on which is positioned one of two rollers 118. These rollers are positioned in the plane of the disc 96 within the housing 115, and the chords of the two surfaces 96b are such as to form with the housing two roller-chambers of radially graduated width so that, when the housing 115 is rotated in the direction indicated by the arrow on the disc 96 in Fig. 11, the two rollers are gripped between the respective surfaces 96b and the internal annular surface of the housing 115. Upon rotation of the housing 115 in the direction indicated, the disc 96 is locked thereto by the rollers 118 and is thus caused to rotate with the housing in that direction. When the housing 115 is rotated in the opposite direction, however, the rollers 118 are not gripped between the two surfaces 96b and the internal annular surface of the housing because the rollers are then being urged toward the wide ends of their respective roller chambers wherein the radial spacing between the gripping surfaces is greater than the diameter of the enclosed roller. The clutch disc 96 is therefore not effective to transmit motion in the opposite direction.

The shaft 53 is enlarged in diameter at 53a (see Fig. 9) to form a shoulder for locating the clutch disc 96 which is pressed onto the shaft. Loosely mounted on the shaft enlargement 53a are a circular plate 119 and a sleeve 120 to the latter of which is firmly affixed a circular disc 121 having a radially extending arm 121a. A spiral spring 122 disposed within the housing 115 is anchored by means of a square aperture 122a (see Fig. 11) to an inwardly projecting ear on the housing, and the inner end of this spring is similarly anchored to the sleeve 120. The arm 121a rests upon one of the frame spacers 28 (see Fig. 9) against which it is pressed by torsion force of the spring 122. The spring 122 continuously urges the housing 115 and spur gear 113 in the direction of rotation indicated by the arrow on the clutch disc 96 in Fig. 11. As presently will be made clear, the spring 122 is the return spring for the time indicator 35. It is at all times partially wound and thus partially energized, but becomes further energized in response to rotation of the housing 115 in the direction indicated by the arrow on the ratchet wheel 114 in Fig. 11, this direction being opposite to that indicated by the arrow on the clutch disc 96 in the same figure.

A semi-circular edge portion of the housing 115 is cut away to a depth equal to the thickness of the disc 121 to form two diametrically opposite shoulders 115a which afford stop surfaces co-operating with the arm 121a to limit the distance of rotation of the housing and of the gear 113 and ratchet wheel 114 (see Fig. 11) to facilitate assembly of these parts. The maximum possible rotation of these three components is considerably less than one-half turn. The actual maximum rotation is even less, being of the order of 140°. As shown in the drawings, for instance Fig. 23, the gear 113 is meshed with a gear sector 124 affixed to a shaft 125 which also carries the time indicator 35. Rotation of the gear 113 is necessarily accompanied by rotation of the sector 124, the shaft 125, and the time indicator 35; the time indicator 35 is biased by the spring 122 toward the zero scale position; and rotation of the ratchet wheel 114 in the direction indicated by the arrow in Fig. 11 results in a corresponding movement of the time indicator 35 away from the zero scale position, and to a corresponding extent.

An externally flanged ring 126 (see Fig. 9) pressed onto one end of the sleeve 112 serves as a retainer for a time control plate 128 and a bellcrank 129, both of which are rotatable on the ring 126 relatively to the ratchet wheel 114 and gear 113. This time control plate (see Fig. 11) has an arcuate slot 128a therethrough which clears the shank of a screw 130 threaded into a tapped hole in the ratchet wheel 114 and by means of which the time control plate can be secured against rotation relatively to the ratchet wheel in any rotative position within the limits determined by the length of the slot 128a. Provision is thereby made for adjusting the time control plate relative to the ratchet wheel so as to vary the unit of time during which the mechanism will operate in response to actuation by a major coin. The time control plate 128 has two peripheral teeth 132 and 133 rotatively spaced to a degree corresponding to one-half of the total distance of rotation of the gear 113 or, otherwise stated, one-half the total arcuate sweep of the time indicator 35.

The coin gauge arm 91 has a laterally projecting ear 91b which overlaps the time control plate 128 in the direction parallel to the axis of rotation thereof; and when the coin gauge, including both arms 90 and 91, is pressed inwardly by a major coin, as shown in Fig. 21, the ear 91b is so positioned radially that it is operative to engage one or the other of the two teeth 132 or 133, depending upon which of the two teeth is then in position to be so engaged, and will effect such engagement when the coin carrier is thereafter rotated by the power mechanism in the manner previously explained.

When the meter is fully run down, the tooth 132 is so positioned that, upon rotation of the coin carrier with a major coin therein, it will be engaged by the ear 91b, and the time control plate, together with the ratchet wheel 114, gear 113, and housing 115, will consequently be rotated through a distance sufficient to displace the time indicator 35 to an extent corresponding to a major unit of time, usually one hour. Rotation of the time control plate results in shifting the rotative position of the two teeth so that the tooth 133 then occupies the position previously occupied by the tooth 132; and if a second major coin is promptly deposited and the push plate 41 is depressed, as before, the ear 91b will engage the tooth 133 and, as a result, the time indicator will be further displaced to an extent corresponding to a second major unit of time of the same duration as the first-mentioned major unit. If, on the contrary, there is a considerable delay between the deposit of the first major coin and the deposit of the second major coin, the ear 91b will not engage the tooth 133 but will, instead, again engage the tooth 132 because during the interim the time control plate slowly rotates in the opposite direction under impetus of the spring 122, subject to restraint of the brake mechanism 99.

The bellcrank 129 is freely rotatable on the ring 126, and has a relatively long arm 129a and a short arm 129b which latter is connected, as will later be explained, to a coin counter which functions to totalize the deposited coins in minor coin units. The free end of the arm 129a is approximately co-terminous with the teeth 132 and 133 and consequently when the time control plate 128 is rotated, as a result of engagement of one of its teeth by the coin gauge ear 91b, the free end of the arm 129a will also be engaged by this ear, and the bellcrank will accordingly be rotated. The mechanism whereby the coin counter is actuated to record receipt of a major coin in response to rotation of the bellcrank 129 will be discussed in detail at a later point.

*Operation with a minor coin*

Special reference is now made to Figs. 9, 13 and 23–25 in conjunction with the ensuing description of mechanism having to do specifically with setting of the meter in response to a minor coin, and explanation of the mode of operation thereof.

The diameter of a minor coin is enough smaller than that of a major coin so that the coin gauge is not pressed inwardly thereby far enough to enable the coin gauge ear 91b to engage either tooth 132 or 133. The ratchet wheel 114 has a series of peripheral ratchet teeth 134 engageable by a pawl 135 having a tooth-engaging lug 135a. This pawl comprises two parallel arms 135b and 135c which are laterally spaced and joined together by a bridge portion 135d. The arm 135c is notched to form a shoulder at 136 which is positioned for engagement by the ear 91b of the coin gauge arm 91 whenever the coin carrier is rotated with a minor coin, as illustrated in Figs. 23–25. The pawl 135 is pivotally connected at 137 to the distal end of an arm 138 which is mounted for free rotation on a bushing 139 fixedly secured to and carried by a shaft 140 (see Fig. 9). A spring 142 having one end connected to the arm 135b and the other end anchored to a finger 141a on a bracket 141, serves normally to hold the pawl 135 and the arm 138 in the retracted positions shown in Fig. 23 where the coin carrier occupies its normal coin-receiving position with a minor coin inserted therein. Fig. 24 shows the condition which obtains when the coin carrier is partially rotated with a minor coin, the ear 91b being about to engage the shoulder 136 on the pawl 135. Fig. 25 shows a condition which obtains after the ear 91b has engaged the shoulder 136 of the pawl 135 and the coin carrier has completed its rotary movement. When the ear 91b encounters the shoulder 136 the pawl 135 is rotated clockwise about its pivot 137 until the lug 135a is seated in a notch between two of the ratchet teeth 134; thereafter the force imparted to the pawl 135 by the coin gauge produces rotation of the ratchet wheel 114 and concurrent rotation of the gear 113. Because the pawl 135 is precluded from further rotation after engaging the ratchet wheel 114, any further movement thereof by the coin gauge causes the arm 138 to rotate from the normal position in which it is shown in Fig. 23 to the alternate position of Fig. 25. The rotative displacement of the ratchet wheel 114 effected by a single actuation of the pawl 135 in response to a minor coin, is a proportional part of the angular displacement thereof which occurs in response to a major coin. For example, if the value of the minor coin is one-fifth that of the major coin, the mechanism would ordinarily be so designed that the distance of rotation of the ratchet wheel 114 effected by a single actuation of the pawl 135 is one-fifth the distance of rotation thereof effected in response to a major coin. It is optional, however, to design the mechanism otherwise, so as to cause a disproportionate displacement of the ratchet wheel in return for a minor coin.

*The coin counter and counter actuating mechanism*

The coin counter per se which is identified as a whole by reference numeral 145 is shown in perspective in Fig. 13. It is removably attached to and supported by the rear frame plate 27 at the location shown in Fig. 7, and operates to count the coins in relation to the number deposited, and not in relation to the time registered on the indicator. This device includes a driven spur pinion 146 which is continuously in mesh with a spur gear 147, and rotation of the pinion 146 is effective to actuate the counter and thus cause the numerical reading to progress in proportion to rotative advance of the gear 147. To register a major coin on the counter, the gear 147 must rotate through a distance which is proportionate to the value of the major coin, and likewise to register a minor coin the gear 147 must rotate through a distance which is proportionate to the value of the minor coin.

Referring now to the bellcrank 129 (see Fig. 11), it has been previously noted that when the coin gauge ear 91b engages one of the two teeth 132 or 133 on the time control plate 123 it also engages the free end portion of the bellcrank arm 129a, being thus adapted to rotate the bellcrank at the same time that it rotates the time control plate. The ear 91b also engages the arm 129a and one or the other of the teeth 132 or 133 only when a major coin is in the coin carrier. The bellcrank 129 is never displaced from its normal position save in response to the deposit of a major coin.

A sheet metal rocker 148 (see Fig. 13) which is freely rotatable on the bushing 139 (see Fig. 9) includes an arm 148a which is apertured to receive the laterally projecting lower end of a link 149 the upper end of which engages an aperture in the short arm 129b of the bellcrank 129, as clearly shown in Figs. 19 and 21. The rocker 148 also includes a pair of laterally projecting fingers 148b and 148c the function of which will be explained later.

Fixedly secured to and rotatable with the sleeve 139 is a small ratchet wheel 150; and attached to the rocker 148 is a spring pawl 151 the free end of which engages the teeth of the ratchet wheel 150 (see Figs. 13, 19, and 21). A spring dog 154 anchored to the plate 88 has its free end engaged with the teeth of the same ratchet wheel and serves to prevent reverse rotation thereof. Inasmuch as the gear 147 is affixed to the shaft 140 which, in turn, is affixed to the bushing 139 which also is affixed to the ratchet 150, rotation of the rocker 148 in the clockwise direction, as viewed in Figs. 19 and 21, will effect a corresponding rotation of the gear 147 and also a commensurate progression of the coin counter 145. Each rotation of the bellcrank 129 by the coin gauge will cause the rocker 148 to be rotated clockwise through the agency of the link 149, and will also effect a rotation of the gear 147 sufficiently to actuate the coin counter to an extent corresponding to a major coin irrespective of the position of the indicator 35.

Freely rotatable on the bushing 139 is a second sheet metal rocker 152. This has an upstanding arm 152a on which are formed two parallel laterally projecting ears 152b spaced apart to loosely embrace the arm 138. This rocker further includes a second arm 152c having a laterally projecting finger 152d and a third arm 152e to the rear face of which, as viewed in Figs. 13 and 23, is secured a spring pawl 153 the free end of which engages the teeth, of the ratchet wheel 150. There are two pawls, 151 and 153, and a spring dog 154 all engaging the teeth of the ratchet wheel 150.

The normal position of the rocker 152 is that shown in Fig. 23 wherein the left-hand ear 152b bears against the adjacent side of the arm 138. As this arm is rotated toward the position shown in Fig. 25, in response to minor coin actuation, it tardily engages the right-hand ear 152b and thus produces a clockwise rotation of the rocker 152 through a small distance. This occurs during the final portion of the driving movement of the pawl 135 which is effected when the meter is set with a minor coin. During this clockwise rotation of the rocker 152 the ratchet wheel 150 is rotated by the pawl 153, but the extent of its rotation is only a fraction of the distance through which it is rotated by the pawl 151 in response to rotation of the rocker 148. The ratio of the two distances of rotation of the ratchet wheel 150 effected respectively by the rockers 148 and 152 corresponds with the ratio of the major and minor coin values. The coin counter is progressed by the lesser rotation of the ratchet wheel 150 to an extent commensurate with the value of a minor coin.

The bracket 141 (see Fig. 13) provides an outboard bearing for the shaft 140, and is rigidly secured to the plate 88 by means of two screws 141b. The part 159 (see Figs. 9 and 13) serves only as a spacer. A cantilever wire spring 163 (see Fig. 19) is anchored at one end to the plate 87 and engages at its other end the finger 148b. This spring functions to bias the rocker 148 counterclockwise toward the position shown in Fig. 19. It also biases the bellcrank 129 toward its normal position (see Fig. 19).

*The coin arresting and release mechanism*

The front frame plate 25 has a rectangular opening 155 (see Figs. 1, 6 and 10) which registers with a window (not shown) in the housing H; and the plate 87 which is spaced rearwardly of the front frame plate 25 has two circular openings 156 and 157 in registration with the opening 155 the purpose being to make visible the last-deposited major and minor coins, thus enabling the attending officer to ascertain whether the operator of a parked car has deposited a proper coin. Both coins are thus exposed to view, and if a slug of major size has succeeded in purchasing time it must be replaced by a major, not a minor, coin for proper operation.

The two plates 87 and 88 are spaced laterally by the plate 86 on which is formed the coin track 85, and also by a spacer strip 89 of the same thickness as the plate 86 (see Fig. 13). The thickness of the plate 86 and spacer strip 89 is slightly greater than that of a major coin, as is also the plate 68 of the coin carrier which is aligned with the plates 86 and 89 (see Fig. 9). Otherwise stated, the coin carrier pocket 75 (see Fig. 11) is aligned laterally with the coin track 85.

When the coin carrier has rotated about 90° from the coin-receiving position in which it is shown in Figs. 19 and 23 to the coin-discharge position of Figs. 21 and 25, the coin is ejected downwardly by the force of gravity. The descending coin passes through the space between the plates 87 and 88 until it either strikes a stop 158 (which is an ear formed on the plate 88 projecting into the coin passageway) or until it strikes a coin held in the passageway and is deflected thereby. Assuming that there is no previously-deposited coin in the meter, when either a major or minor coin drops from the carrier it will strike the stop 158 and will be deflected thereby to one side or the other. If the first-deposited coin is a major coin L, as shown in Figs. 19–22, it will bounce off the stop 158 to the right, as per Fig. 19. This it will normally do because the stop 158 is positioned slightly to the left of the descending major coin. In that event the coin will be caught on an ear 148c which forms an integral part of the rocker 148 and projects laterally therefrom underneath the arcuately curved edge surface 88c formed on the plate 88, and thus into the path of the descending coin. The position in which the coin L is held by the ear 148c and stop 158 in Fig. 19 is in registration with the opening 156, and the coin is accordingly visible through the opening 155 and the window in the meter housing. If another major coin be deposited in the meter while the previous major coin L is held by the ear 148c, as shown in Fig. 19, operation of the meter with a major coin will produce clockwise rotation of the rocker 148 from the position of Fig. 19 to that of Fig. 21, and the ear 148c will move to the left (see Fig. 21) and release the previously deposited coin L while the ear 148b moves in the same direction to a position wherein it is effective to intercept the last-deposited coin. When the rocker 148 is immediately thereafter returned to its normal position (see Fig. 19) as a result of the return movement of the coin carrier, the last-deposited coin is released by the ear 148b and allowed to drop, but is immediately intercepted by the ear 148c. In Fig. 19 a major coin L is shown supported on the ear 148c and stop 158, conjointly. In Fig. 21 the same coin L is shown dropping from the meter as a result of the clockwise movement of the finger 148c; and in the same figure a later-deposited major coin L' is shown supported on the ear 148b. When the rocker 148 returns to the position of Fig. 19, as it does incidentally to the return of the coin carrier to normal position, the coin L' will be released from the position in which it is shown in Fig. 21 and will descend to the position of the coin L in Fig. 19.

When there is no previously-deposited coin in the meter, if a minor coin S is deposited it will take the same course as that previously described with reference to a major coin and will thus appear at the opening 156. It is an unusual condition, however, not to have a coin resting on the ear 148c, as shown in Fig. 19, and one which can obtain only when the meter is first put into service or in event of the coins being removed by a service man and not replaced before the meter is put back into service. Therefore, except for the rare instances mentioned above, there is always a major coin L resting on the ear 148c, as shown in Fig. 19, whenever a minor coin S is deposited.

Under normal conditions when a minor coin S descends from the coin carrier (see Fig. 23) it strikes the previously-deposited coin L and is deflected to the left, and then comes to rest on the ear 152d where it is in registration with the opening 157 (see Fig. 1). Under the same normal conditions there is always a minor coin resting on the ear 152d; and when the rocker 152 is rotated clockwise from the position of Fig. 23 to that of Fig. 25, the ear 152d is moved sufficiently to the left (see Fig. 25) to release the previously-deposited minor coin. The rocker 152 is not displaced from its normal position until the coin carrier has reached nearly the end of its counter-clockwise rotation, and it is thereafter quickly released for return to normal position. Consequently, a complete operation of this rocker takes place so rapidly that the ear 152d is in position to intercept the last-deposited minor coin immediately following discharge of the previously-deposited minor coin, and before the last-deposited coin can descend far enough to escape interception. While it is necessary to provide two ears on the rocker 148 to intercept and release major coins, such is not the case for the interception and release of minor coins, due to the rapid action of the rocker 152.

The trouble flag

The shaft 125 (see especially Figs. 9, 14 and 26) is journaled for rocking movement at its opposite ends in the front frame plate 25 and the intermediate frame plate 26, and mounted for free rotation on this shaft is a U-shaped member 160, best shown in Fig. 14. The member 160 comprises two parallel arms 160a and 160b the former of which includes a flag portion 160c which preferably is painted some distinctive color so that it will readily be seen when in exposed position. The arm 160b carries a laterally projecting pin 161 the function of which will be explained later.

As best shown in Figs. 27-29, the power plate 48 is contoured to provide a peripheral cam surface 162 which includes an arcuate mid-portion 162a concentric with its center of rotation and terminating in two tangential end portions 162b and 162c. The bottom edge of the arm 160a rests on the cam surface 162 and normally overlies the portion 162b thereof, as shown in Fig. 27. When thus disposed the flag 160c is down and out of sight; but when the power plate 48 is rotated to its alternate position, as shown in Fig. 28, the cam portion 162c rotates the member 160 clockwise, thus causing the flag 160c to rise to a position in which it is visible. If for any reason the power plate should fail to return (arising perhaps from a jammed coin carrier or a broken power spring) the flag 160c will remain up and thus inform the attending officer that the meter is out of order. This device constitutes one of the novel features of this invention.

The coin carrier locking mechanism

In prior meter constructions it has been possible to produce a limited rotation of the coin carrier through use of two coins and thus obtain a certain amount of parking time without forfeiting either coin. In such circumstances the coin gauge would be depressed sufficiently to render it effective to actuate the time-setting mechanism, and the coin carrier to be rotated independently of the power mechanism sufficiently to obtain some parking time, but without rotating the coin carrier far enough to discharge either coin. Any such attempted fraudulent operation is prevented in the present meter by a mechanical arrangement which locks the coin carrier in its coin-receiving position until just an instant prior to the moment when it must be released to permit rotation thereof by the power mechanism, thus making it impossible to unlock the coin carrier without causing it to be rotated by the power mechanism to its coin-discharge position.

Referring first to Fig. 11, the coin carrier intermediate plate 68 is notched to form a shoulder at 68a; and now referring to Fig. 27, wherein both the coin carrier 66 and the power plate 48 are shown in normal position, the arm 160b of the U-shaped member 160 is so positioned that its free end engages the shoulder 68a in such manner that it is effective to prevent clockwise rotation of the coin carrier.

In Fig. 28 the power plate 48 is in an alternate position wherein the pusher link 46 is about to disengage the roller 54 and thus allow the power plate to return to the position of Fig. 27 under the impetus of the power spring 51. The member 160 is here shown to have been rotated clockwise by the cam surface 162c to such an extent that the arm 160b is out of the path of the shoulder 68a. When the power plate 48 starts its return movement, the coin carrier is then free to rotate therewith. Fig. 29 shows the coin carrier in its coin-discharge position and the power plate 48 in its normal position the coin carrier being about to return to the normal position of Fig. 27. By suitable configuration of the cam surface 162c, as shown, the arm 160b is operative to release the coin carrier only an instant before the power plate is released to return to its normal position, and for that reason it is practically impossible for anyone to unlock the coin carrier by depressing the manually operable coin inductor 41 without at the same time releasing the power plate. It would be even more difficult to do so while at the same time trying to rotate the coin carrier by means of two coins, or by a specially shaped instrument inserted through the coin slit 40.

As previously explained, the trouble flag 160c is elevated when the power plate 48 is in its alternate position, as per Fig. 28, and in the event of failure of the power plate to return to normal the trouble flag will remain up. The trouble flag is also effective to signal a failure of the coin carrier to return to its normal position. The coin carrier plate 68 has an arcuate peripheral surface 68b terminating at the shoulder 68a, and the lower edge of the arm 160b comes to rest on this arcuate surface immediately upon commencement of the clockwise rotation of the coin carrier (see Fig. 29). The trouble flag is thus held in elevated position until the coin carrier has virtually completed its return movement. If for any reason the coin carrier should fail to return, the trouble flag will then remain up and thereby indicate an abnormal condition.

The arrangement for locking the coin carrier and automatically unlocking the same at the proper instant, and the arrangement for operating the trouble flag in event of failure of the coin carrier to return, constitute two of the features of the present invention.

The violation flag and operating mechanism therefor

It is desirable to have the violation flag in an elevated position when withdrawn from view, and also to position the time indicator 35 so that it is visible from two opposite sides of the meter. In the accomplishment of these ends we incorporate in the structure two similar dial plates 165 each of which, as best shown in Fig. 10, consists of an arch-like sheet metal stamping to at least one face of which is applied a graduated scale 37. The two ends of each dial plate are notched at 165a so that each may embrace one of the two upper tie bolts 29; and the dial plates are clamped between adjacent spacers 28 and thus firmly secured in place, although easily removable upon loosening of the two upper tie bolts.

The two dial plates 165 are in parallel spaced relation, as best shown in Figs. 7 and 8, and positioned intermediately thereof are the time indicator 35 and a violation flag member 166. The latter may be a sheet metal stamping affixed to a tubular hub 167 and, as shown, it comprises an upwardly extending arm 166a, including the flag 166b, per se, and two more or less parallel additional arms 166c and 166d. These two arms extend obliquely in a downward direction from the hub 167 when the flag is in its visible position, as per Fig. 27, but otherwise they extend horizontally, or approximately so, as per Figs. 28-30. The arm 166c has a lateral finger 166e which projects through an arcuate slot 26a in the intermediate frame plate 26, and this slot co-operates with the finger 166e to limit the distance of rotation of the flag member 166 in both directions. The hub 167 of the flag member is provided with a tubular bushing 167a the bore of which slidably fits one of the two upper tie bolts 29. It will be apparent that the flag member is freely rotatable about the axis of the hub 167, and that when rotated clockwise, as viewed for example in Fig. 27, to the limit permitted by the slot 26a and the finger 166e, the flag 166b is clearly visible. Also, when rotated counterclockwise to the alternate limit permitted by the slot 26a, the flag 166b is hidden from view by the two dial plates 165 (see Figs. 28-31).

The time indicator 35 is affixed to a hub 168 (see Fig. 9) which, in turn, is affixed to the shaft 125; and the toothed sector 124 is also mounted on this hub and secured between two friction washers 169 and 170. This sector is not rigidly affixed to the hub 168, but the frictional coupling therewith is sufficient so that the hub and the time indicator 35 normally rotate with the sector 124, while at the same time allowing the time indicator and the hub to be forcibly rotated relatively to the sector for the purpose of adjusting the indicator with reference to the graduated time scale 37. One side of the hub 168 is made flat in a plane parallel to its axis of rotation (see Figs. 14, 26 and 31), the flat surface being identified by reference numeral 168a. Its purpose will presently be made clear.

In prior meter constructions the violation flag has been directly actuated by the manually operable element corresponding to the push plate 41 of the present application, and when properly operated the flag-raising mechanism employed in those meters worked satisfactorily; but through tricky manipulation of the manually operable element it has been possible to set such a meter without raising the violation flag. It is a feature of the present invention to provide for actuation of the violation flag in a manner which avoids all possibility of faulty operation, or failure of operation, resulting from irregular or tricky manipulation of the manually operable element.

A U-shaped rocker member 172 is supported at one end on the shaft 125 and at the other end on the hub 168, being freely rotatable through a limited arc relatively to both said shaft and hub. The pin 161 projecting laterally from the arm 160b of the member 160 is so positioned that when this member is rotated clockwise from the normal position of Fig. 27 to that shown in Fig. 28, said pin will engage the adjacent edge surface of the rocker member 172 and rotate the latter clockwise. The rocker member, in turn, engages the under side of the arm 166d of the flag member 166 and rotates the latter counterclockwise so that the flag 166b is elevated to the position in which it is shown in Figs. 28-31, wherein it is hidden from view by the two dial plates 165.

Counterclockwise rotation of the power plate 48 (see Fig. 28) is effective to lift the flag, and the immediately ensuing clockwise rotation of the coin carrier is effective momentarily to hold the member 160 in its off-normal position during the return of the power plate to its normal position. However, as soon as the coin carrier has returned to its coin-receiving position the member 160 is restored to the position shown in Fig. 27 because the coin carrier plate 68 is then no longer effective to hold the arm 160b in its elevated position. In the absence of means to the contrary, the violation flag 166b would return to the down position as soon as the coin carrier has completed its return movement, but such an operation should not be permitted because the flag is to remain invisible until the time on the meter has expired.

The ratchet wheel 114 (see Figs. 11, 30 and 31) has a notch 114a defining a ledge at 114b and a shoulder 114c. This shoulder normally engages the thimble 80 (see Fig. 19) with which it co-operates to limit the rotation in one direction of the sub-assembly including the ratchet wheel 114, gear 113, clutch housing 115, and the time control plate 128. When the coin carrier with a coin therein is rotated from coin-receiving to coin-discharge position, the above-indicated sub-assembly is rotated in the clockwise direction (see Figs. 30 and 31) through a distance commensurate with the value of the coin. When the ratchet wheel 114 is in the position indicating a fully-expired meter condition, the shoulder 114c rests against the thimble 80 and the ledge 114b is so positioned that the adjacent portion of the rocker member 172 overlies the notch 114a. Consequently, until the meter is again energized the rocker member 172 is without support, except at the ends which are pivotally connected to the shaft 125 and the hub 168; and there is accordingly nothing to retain the violation flag in its concealed position.

Now considering a condition wherein the violation flag has been raised as a result of rotation of the power plate 48 and is momentarily held in an elevated position by the coin carrier plate 68 acting on the arm 160b, it will be apparent that the rocker member 172 is then in a position to clear the ledge 114b. Therefore, when the ratchet wheel 114 is rotated clockwise by the coin carrier, through the agency of the coin gauge, the peripheral sector 114d (see Fig. 31) will at once move to a position underneath the rocker member 172 and thus provide a support therefor which takes the place of the support initially afforded by the pin 161. We have accordingly devised a simple expedient which serves to provide support for the violation flag during that portion of the movement of the ratchet wheel 114 when it will not function to hold the violation flag in fully elevated position. This expedient involves co-operative interaction between the hub 168 and the free end of the arm 166d. When the time indicator 35 is at and near the zero end of the dial scale (see Fig. 31) the flattened side 168a of the hub 168 is so positioned that the arm 166d is free to pass; in other words, when the ratchet wheel 114 has arrived at the position wherein the ledge 114b has passed the rocker member 172, so that the surface 114d no longer provides support for the rocker member, the arm 166d will clear the hub 168 because of the flattened side thereof. But by the time the ratchet wheel 114 has rotated clockwise to the point where the rocker member 172 can no longer be supported on the sector 114d, the hub 168 has rotated to a position wherein it is effective to prevent downward movement of the arm 166d. This is clearly illustrated in Fig. 30.

When the ratchet wheel 114 is in the rotative position shown in Fig. 30, the rocker member 172, if not otherwise supported, would rest on the periphery of the ratchet wheel in the path of the shoulder 114c and might on that account impede counterclockwise rotation of the ratchet wheel; this might either stop it entirely or else apply additional braking force and thus increase the time required for the indicator to return to zero over and above the normal period. To obviate such a contingency, the arm 166c is designed to underlie the rocker member 172 when the arm 166d is supported by the hub 168, as shown in Fig. 30; the violation flag 166 is then supported in an up position out of view of the attending officer. It may not always be necessary to make use of the hub 168 to support the violation flag, and the shoulder 114c may be supplanted by a stop which will permit the sector 114d to be extended far enough to provide support for the rocker member 172 throughout the entire sweep of the time indicator.

Blocking the meter against operation by apertured slugs or washers

Referring to Figs. 11 and 12, the rocker 175 is secured to the adjacent side of the coin carrier 66 and is bent along the line 176 to provide in contact with the coin carrier a fulcrum about which the rocker is adapted to oscillate through a small distance. An aperture 177 is designed to receive the enlarged portion of the pin 82 which is attached to the coin carrier, and another aperture 178 is provided to receive another pin (not shown) projecting from the side of the coin carrier. These two pins which are centered on the line 176 serve to locate and mount the rocker 175 so that it will revolve with the coin carrier and retain its positional relation thereto while at the same time being free to rock on its fulcrum 176. A third aperture 179 is positioned near but to one side of the fulcrum 176 and is designed to clear the enlarged shank portion of a shouldered screw 180 which is threaded into the coin carrier. A helico-conical wire compression spring 181 embraces the enlarged shank portion of the screw 180, and is interposed between the head of this screw and the adjacent outer surface of the rocker 175 so that the leg 175a of this rocker is normally pressed by the spring against the side of the coin carrier. The other leg 175b lies in a plane which is acutely angular to the plane of the leg 175a and therefore normally extends from the fulcrum 176 at an acute angle to the adjacent side of the coin carrier. This is clearly shown in Fig. 12. The outboard end of the leg 175b has a laterally projecting pointed finger 175c which is aligned with a clearance notch 184 formed in the coin carrier plate 67. It will be apparent that the rocker 175 is capable of being rotated out of its normal position of Fig 12 so that the finger 175c will enter the coin pocket 75 through the clearance notch 184; if there is a proper coin in the pocket 75 the pointed end of the finger 175c will be intercepted thereby, and the degree of possible rotation of the rocker will thus be substantially reduced. The pointed end of the finger 175c is positioned to align with the central area of any coin in the coin pocket which would be capable of moving the coin gauge to an effective position. Hence, if a washer corresponding in diameter to either a major or minor coin is inserted into the coin carrier, its aperture will clear the end of the finger 175c and, accordingly, will not interfere with rotation of the rocker 175 about its fulcrum. Other components about to be described co-operate with the rocker 175 in such manner that the power plate 48 is prevented from rotating far enough to permit the latch 60 to drivably engage the roller 83 unless the end of the finger 175c is intercepted, as by a valid coin in the coin pocket. Consequently, any attempt to set the meter through use of a washer will be frustrated because of failure of the power plate to drivably engage the coin carrier.

A leaf spring 185 (see Fig. 11) secured by a rivet 186 to the face of the power plate 48 has a free end portion 185a which is operative to contact the leg 175b of the rocker 175 and thus urge the leg toward the coin carrier whereby to cause the finger 175c to move into the coin pocket or to engage the adjacent face of a coin in the coin pocket, depending upon whether or not a proper coin has been deposited. The spring 185 is so positioned, however, that it does not normally engage the rocker 175 but, instead, makes contact with the leg 175b thereof only after the power plate 48 on which it is mounted has been rotated to some extent away from its normal position. Thus, when both the power plate and the coin carrier are in normal position the finger 175c is retracted by the action of the spring 181. This is necessarily so because otherwise the finger 175c would interfere with admission of a coin to the coin pocket 75.

If the power plate 48 be rotated, as by depressing the inductor push plate 41, and there is no coin in the coin carrier pocket, or, alternatively, that there is a washer therein, then when the free end portion 185a of the leaf spring 185 makes contact with and moves along the angularly extending leg 175b, the latter will be deflected so that the rocker 175 will rotate about its fulcrum 176. The spring 181, being relatively weak, will yield to the dominant pressure exerted by the spring 185.

Rotation of the rocker 175 causes the free end of its leg 175a to be moved against the adjacent surface of the power plate 48; and attached to the power plate is a laterally projecting pin 186 which is positioned to engage the end of the leg 175a whenever there exists a condition as above noted. As a result, further rotation of the power plate is blocked, and the blocking occurs before the power plate has rotated far enough for the latch 60 to clear the roller 83 and thus be in a position to drivably engage the roller during the return rotation of the power plate. If there is a proper coin in the coin pocket of the carrier, the pointed end of the finger 175c will make contact therewith, thus preventing further rotation of the rocker 175 which is sufficiently stiff to resist yielding under pressure of the spring 185. The leg 175a will then clear the pin 186, thus removing any impediment to full rotation of the power plate.

Means is provided to release the rocker leg 175b from pressure of the spring 185 at the time the coin carrier reaches its coin-discharge position. To that end the spring 185 is so positioned that its free end 185a traverses an arcuate path which coincides with the inner edge of the rocker 175, and the latter is so formed that the contacting end of the spring passes therebeyond after the pin 186 has arrived at a point beyond which it cannot be engaged by the leg 175a so as to obstruct further rotation of the power plate. Release of the rocker from the action of the spring 185 is preferably deferred until just before the power plate is released to return to its normal position and after the latch 60 has arrived at the point where it can drivably engage the roller 83. It would be possible otherwise to first insert a major coin and then partially depress the coin inductor 41 and thereafter withdraw the major coin and replace the same with a washer, while at the same time further depressing the inductor push plate to the full extent of its inward stroke. Such a manipulation is almost impossible to perform where the rocker 175 is not released from the spring 185 until the roller 54 is very close to being released from its driving engagement with the pusher link 46.

*The barrier for preventing insertion or withdrawal of a coin when the manually operable element is partially depressed*

Referring first to Fig. 13, there is here shown a U-shaped barrier element 188 made preferably of stiff spring-tempered wire and comprising two parallel arms 188a interconnected at their upper ends by a crossbar 188b and having two opposing trunnions 188c at their respective lower ends. These trunnions are inserted, individually, in apertures 189 and 189a in the respective plates 87 and 88 for rotative movement therein. The common axis of the trunnions 188c constitutes the pivotal center of the element 188. The normal position of this element is shown in Fig. 18 wherein the crossbar 188b rests on an inclined surface 41a formed on the back of the inductor push plate 41. In Fig. 16, wherein the coin inductor is shown almost fully depressed, the element 188 is represented as having been rotated clockwise by the camming action of the surface 41a so that the crossbar 188b is considerably elevated above the position which it occupies in Fig. 18. When in the normal position of Fig. 18, the crossbar 188b is at an elevation below the lowermost extremity of the coin slit 40 and consequently does not offer any impediment to passage of coins therethrough. But, as the push plate 41 is depressed the crossbar 188b is elevated (see Fig. 16) so that it lies opposite the coin slit 40. When the coin inductor is depressed to a certain extent it is no longer possible to pass either a major or minor coin through the coin slit (see Figs. 16 and 18). Hence, it is not possible to withdraw a coin from the coin carrier while holding the push plate 41 in a substantially depressed position; nor is it possible to use a second coin to press inwardly against a previously inserted coin. It is impossible, for example, to cheat the meter by inserting a minor coin and pressing the same into the coin carrier by a second coin or by an appropriate tool, such as a hack saw blade, while depressing the push plate 41.

The rocker 175 remains subject to pressure from the spring 185 until just prior to the instant when the power plate 48 is released and after the latch 60 is in position to drivably engage the roller 83 and thus effect a coupling between the power mechanism and the coin carrier, it being otherwise possible to make successful use of washers. But when the meter is equipped with a coin slot barrier which functions in the manner of the element 188, it is impossible to withdraw a coin from the coin carrier while holding the manually operable coin inductor 41 in a depressed position, assuming that the degree of depression is sufficient to enable the leg 175a of the rocker 175 to clear the pin 186. It is accordingly impossible when the barrier is employed to substitute a washer in place of a coin, after using the coin, to circumvent action of the rocker 175 in the manner described, even though the rocker 175 be released from the restraint of the spring 185 immediately after the leg 175a has cleared the pin 186 and considerably prior to the instant of release of the power plate. The point at which the rocker 175 is released from restraint of the spring 185 need not be precisely fixed, and it is possible, in consequence, to use a much wider production tolerance in the manufacture of the involved parts.

*Provision for preventing malicious misdirection of coins*

In the exploded view of Fig. 10 there is shown a formed sheet metal arm 190 comprising two parallel side plates 190a, a bridge portion 190b interconnecting the side plates, and a laterally projecting ear 190c. The side plates 190a are provided with aligned openings 190d by means of which the arm 190 is pivotally supported on a screw 191 which extends through the loop of the spring 47, thence through a bushing 192 on which is pivotally mounted the pusher link 46, and thence through an opening drilled in the boss 41d, forming an integral part of the push plate 41, and through the aligned openings 190d. At its threaded end the screw 191 is provided with a nut 193. The bridge portion 190b is provided with a slot 190e wide enough to pass a major coin and having an upper extremity which serves to block upward diversion of the coins. The spring 47 bears downwardly at one end on the pusher link 46 and upwardly at the other end on the ear 190c and thus normally serves to hold the arm 190 in the raised position shown in Figs. 15 and 18. In this position the arm 190 is yieldably held by an ear 190f formed on the arm and normally bearing against an upper edge of the push plate 41 (see Fig. 18).

The maximum spacing between the rear face of the push plate 41 and the adjacent edges of the plates 87 and 88 which define the slot leading to the coin track and the coin carrier pocket, is small enough so that a minor coin, as well as a major coin, will readily bridge the gap therebetween. It is not possible in normal operation for a customer to so insert a proper coin that it will not enter the slot between the plates 87 and 88 and then pass on into the coin carrier, even in the absence of the arm 190. But it is possible, in the absence of this arm, through the use of a second coin to propel a first-inserted coin upwardly, while at the same time causing it to turn in such a way that instead of entering the coin carrier it will take an abnormal course and either become lodged in the mechanism or drop to the bottom of the housing and come to rest without entering the coin receptacle located below the meter mechanism. The arm 190 with its slot 190e simply provides an intermediate coin guide which is effective to prevent both upward and lateral diversion of an inserted coin, thus defeating any such improper manipulation. A fixed guide to serve the purpose would interfere with the essential movement of the push plate 41.

When the push plate 41 is in its normal outward position (see Fig. 18) the arm 190 is so poised that its slot 190e largely bridges the gap between the rear extremity of the coin slit 40 and the forward extremity of the slot between the plates 87 and 88 leading into the coin carrier pocket, and the upper extremity of the slot 190e is so positioned that it would be impossible to propel upwardly a coin inserted through the coin slit 40. The sides of the slot 190e afford supplemental lateral support for inserted coins, particularly minor coins, to such an extent that it is not possible to cause any such coins to be diverted laterally of the path provided therefor.

As the manually operable push plate 41 is pressed inwardly, the arm 190 moves with it and for a time retains its same position relatively thereto, but presently the ear 190c at the distal end of the arm 190 strikes the power plate, stopping short of the coin carrier; and when that occurs the arm must yield, otherwise it would prevent further depression of the inductor pusher plate 41.

*The relieved coin track*

Where the major and minor coins are of five-cent and one-cent denomination, the diameter difference is small, being about .070″. If the curvature of the coin track 85 be of constant radius from the major axis of the meter, the radius of the path of the coin gauge ear 91b obviously differs only to that extent as between major coins on the one hand and minor coins on the other. With a minor coin in the carrier the radius of the path of the ear 91b would then be approximately .070″ greater than the radius of the path of said ear with a major coin in the carrier. When a major coin is deposited the ear 91b must drivably engage one of the two identical teeth 132 or 133 on the time control plate 123, and when a minor coin is deposited this ear must not only clear the tips of those teeth but must drivably engage the shoulder 136 on the pawl 135. If it be assumed that the ear must move outwardly .030″ to clear one of the teeth 132 or 133 and another .030″ to satisfactorily engage the shoulder 136, both of which are less than conservative allowances, then there is a total allowable margin of only .010″ as respects the radial locations of the tips of the teeth 132 and 133 and the tip of the shoulder 136. Considering that those locations, especially that of the tip of the shoulder 136, are subject to several possible manufacturing variables, any such margin is much too small where volume production is involved.

It has been necessary with prior devices to maintain a number of very close tolerances in order to achieve reliable engagement of the coin gauge with the tooth or teeth of the time control plate and, alternatively, with the pawl 135 while at the same time ensuring positive differentiation, i. e., positive avoidance of overlap. Once the coin gauge has made contact with one of the teeth of the time control plate (which it can do only under the compulsion of a major coin) it is unnecessary to continue to hold the coin gauge in its depressed position by means of the coin. Displacement of the coin gauge by major and minor coins, respectively, takes place in entirely distinct sectors. Therefore the radius of curvature of the track 85 in one sector is wholly functionally independent of that in the other sector, and may differ therefrom to any extent within certain practical limitations which do not inhibit the attainment of our objective.

In the normal position of the tooth 132 (see Fig. 19) the coin gauge ear 91b engages that tooth while the major coin is still within the upper portion of the coin track; and by reference to Fig. 24 it will be noted that the said ear 91b does not engage the shoulder 136 until the minor coin is nearly at the lower end of the coin track. By making the radius of curvature of the coin track substantially less at the upper portion, as at 85a in Fig. 24, then at its lower portion 85b the coins are caused to move radially outwardly as they proceed down the track and in consequence the shoulder 136 may be located at a position which is more remote from the axis of rotation of the coin carrier than it otherwise could be. If the curvature of the track at 85b were the same as at 85a, and the shoulder 136 were positioned as shown in Fig. 24, the ear 91b would escape the shoulder 136 and thus fail to advance the time indicator; but with the increased radius of curvature at 85b the minor coin allows the coin gauge to move outwardly far enough to engage said shoulder. Because of this change in the coin track the effect is the same as if the difference in diameter between major and minor coins were increased by an amount equal to the difference between the radii of the track sectors 85a and 85b. As a result of this change in the coin track contour and the consequently increased difference between the two alternate contact positions of the coin gauge ear 91b, it is not necessary to main extremely close manufacturing tolerances with respect to the parts which directly and indirectly control the selective action of the coin gauge.

Referring now to Figs. 11, 19 and 21, let it be assumed that the meter has been set to afford one major unit of time, for example, one hour, and that twenty minutes of the hour have expired when another major coin is deposited and the push plate 41 is depressed. In such circumstances the coin gauge ear 91b will not engage the tooth 133 because that tooth has been retracted too far for the purpose. It would be possible otherwise to obtain much more than two major units of parking time in response to deposit of two such coins. But the tooth 132 is within the sector 85b of the coin track and, save for the provision about to be explained, is not engageable by the ear 91b. This assumes that the increase of radius of the coin track contour at the sector 85b, as compared to the sector 85a, is of such magnitude that the path of the ear 91b is beyond the tip of the tooth 132. Such being the case, a customer then depositing a major coin would obtain no parking time in return. This difficulty has been overcome through the medium of the bell-crank arm 129a that extends radially to a point which coincides with the tips of the teeth 132 and 133, and is provided with an upwardly projecting teat having a short inclined surface 129c which stands in the path of the ear 91b. Whenever one of the two teeth 132 or 133 is in normal position, as per Fig. 19, to be engaged by the ear 91b when the latter is fully depressed by a major coin within the track sector 95a, the upwardly projecting teat on the end of the bell-crank arm 129a holds the coin gauge fixedly in position on the engaging tooth; but if neither of said teeth is in position to be engaged by the ear 91b while the latter continues in its fully depressed position, the teat will engage the ear 91b and its inclined surface will deflect said ear inwardly and hold the same in the inwardly deflected position, thus causing it to drivably engage whichever of the two teeth 132 or 133 it may encounter. In the assumed condition, the ear 91b will engage the tooth 132 and the time control plate 128 will accordingly be rotated through a distance corresponding to a twenty-minute interval. This explanation is equally applicable when the meter has been set to afford two major units of time, after which a third major coin is deposited following a fractional time interval, but in that case the tooth 133 would be engaged instead of the tooth 132. If it be assumed that the meter has been set with minor coins, instead of one or two major coins, and that the time indicator is resultantly at some intermediate scale position not corresponding to a major unit of time, the condition which then obtains is in all respects identical with that which obtains when an interval of time has elapsed following deposit of a major coin.

*The coin gauge made in two parts*

The specific parking meter herein described is adapted to be set to afford a maximum of two major units of parking time in exchange for two major coins, or ten minor coins, or one major coin and five or less minor coins. This fact accounts for the presence of the two teeth 132 and 133 on the time control plate 128. If the meter were designed to afford a maximum of one major unit of parking time, only one such tooth would be needed.

Assuming the time indicator 35 to be at zero when a major coin is deposited and the push plate 41 depressed, the coin gauge ear 91b will engage the tooth 132 and rotate the time control plate through a distance corresponding to one major unit of time. If promptly thereafter another major coin is deposited and the inductor plate 41 is depressed, the coin gauge ear 91b will engage the tooth 133 and rotate the time control plate 128 through a further distance corresponding to an additional major unit of time. But if, following the first operation, a substantial period of time, less than a major unit of time, is allowed to elapse before deposit of the second major coin is made, the time control plate will have rotated in the reverse direction to such an extent that its tooth 133 is no longer engageable by the ear 91b. In that case the ear will again engage the tooth 132, and the customer will obtain only a fractional part of a major unit of time in exchange for a major coin. The peripheral edge of the time control plate 128, at and immediately to the rear of the tip of the tooth 133 is too distant from its axis of rotation to allow the arm 91 of the coin gauge to move inwardly as far as it would normally move under the impetus of a major coin. Consequently, if the coin gauge were made of one piece, instead of comprising the two distinct arms 90 and 91, it would not, under such conditions, be possible for a major coin to enter the coin carrier far enough to permit it to traverse the coin track unless, perhaps, by applying enough force to distort the coin gauge. Because the coin gauge arm 90 is free to move inwardly when its companion arm 91 is obstructed by contact with the point of the tooth 133 or the high surface immediately adjacent thereto, there can be no impediment to complete insertion of a major coin under the condition stated.

*The locating plate and its functions*

The locating plate 18 (see Fig. 5) is of generally rectangular form. It includes two oppositely projecting ears 194 designed to overlie the upper edge of the housing body 10. These ears have sloping upper surfaces which match a similarly sloping surface on the under side of the ring 16 (see Figs. 1 and 2). When this ring is clamped down by the retainer 14 it bears on the ears 194, and thus firmly secures the locating plate in its down position within a pair of guide slots 194a formed in the housing body (see Figs. 2 and 3). The locating plate also includes an upper laterally projecting lug 195 and a lower laterally projecting lug 196 the former of which extends underneath one side of the top tubular spacers 28 (see Fig. 2) while the latter overlies one of the spacers 28 which is located at an intermediate height. The lugs 195 and 196 determine the vertical location of the meter mechanism M within the housing while at the same time the lower lug 196 determines the horizontal position of the meter mechanism in one direction because it bridges the space between the plates 26 and 27. Location of the meter mechanism in the horizontal direction normal to the principal plane of the locating plate 18 is fixed because the meter mechanism is pressed against the locating plate by the keeper 20 which latter is resilient and bears against the downwardly sloping internal surface of the housing body 10 and thus acts as a wedge to firmly press the meter mechanism against the locating plate.

Formed integrally with the locating plate 18 is a horizontally disposed shelf-like portion 198 which forms a closure for the upper extremity of the opening 22, being located above the manually operable push plate 41. This shelf portion serves also to frustrate any attempt to tamper with the meter by means of a wire or other instrumentality which otherwise could be passed through the opening 22.

In Fig. 13 there are shown the two plates 87 and 88 between which is interposed the plate 86 on which is formed the coin track 85. The plate 87 has an upwardly projecting arm 87a and the plate 88 has a similar arm 88a, and both arms extend above the upper extremity of the plate 86 and conjointly form a slot which is in alignment with the coin slit 49, as well as the coin pocket 75, and long enough to pass a major coin. The two arms 87a and 88a are chamfered as at 87b and 88b for the purpose of facilitating entry of coins into the slot therebetween.

Because this slot is necessarily long enough to pass a major coin, and further because of the chamfered edges 87b and 88b, it might be possible to force two minor coins, side by side, into the said slot and thus jam the meter. To obviate such a contingency, there are formed on the locating plate 18 (see Fig. 5) two parallel fingers 199 spaced apart at their free ends just enough to receive between them the two arms 87a and 88a. When the locating plate 18 is in place, as per Figs. 1 and 2, the two fingers 199 are positioned at either side of the two arms 87a and 88a, and these fingers are so rigid, laterally of the arm, that it is not possible to force two minor coins into the space between the arms. The locating plate 18 has a rectangular opening 200 through which pass the two arms 41c of the manually operable push plate 41, the two fingers 199 both being confined within the width of the space between said arms and freely clearing the same.

The keeper 20 has a lower arm 202 and an upper arm 203. The lower arm 202 has a rectilinear edge 202a which bridges the two frame plates 25 and 26 and bears against the edges thereof; and it also has an extended portion 202b which occupies the gap between the frame plates 26 and 27 and overlies one of the tubular spacers 29 therebetween. The arm 203 has a portion 203a which bears against an edge of the frame plate 25, and a second portion 203b having an ear 203c which bears against an edge of the frame plate 27; also a portion 203d which extends into and bridges the gap between the frame plates 26 and 27, the portion 203d being curved upwardly at its distal end to partially embrace one of the upper tubular spacers 28. The two portions 292b and 203d, both of which are disposed in the gap between the frame plates 26 and 27, are so spaced vertically that they have to be forced into place between the two tubular spacers against which they bear, the keeper being thus removably attached to the frame of the meter mechanism. The keeper 20 is definitely positioned in all directions with respect to the meter mechanism, as is also the locating plate 18. Such being the case, when the meter mechanism M is lowered into the housing body 10, with the locating plate and keeper both attached to the meter mechanism, the meter mechanism will be correctly aligned with the opening 22 and with a coin slot 204 in a plate 205 which is secured within the housing body 10 immediately below the meter mechanism but not attached thereto. The plate 205 serves to prevent unauthorized access to the coin box B.

Although the invention has been described in terms of the specific illustrated embodiment, it is to be understood that many of the features thereof are of broad application and are to be limited only by the terms of the appended claims.

We claim:

1. In a coin-controlled device, a rotary coin carrier having a coin-receiving pocket and a peripheral opening leading into said pocket for admission of a coin, spring means biasing said carrier rotationally toward a normal coin-receiving position, mechanism for rotating the coin carrier from its normal position to a coin-discharge position, said mechanism including a rotary member co-axial with the coin carrier and positioned adjacent thereto, said rotary member being spring-biased toward a normal rotative position and rotatable through a predetermined angle, in a direction opposite to the direction of rotation of the coin carrier from coin-receiving to coin-discharge position, to an alternative rotative position, latch means operative to drivably intercouple said carrier and rotary member when said member reaches its alternate position whereby subsequently to effect rotation of the carrier from normal to coin-discharge position in response to the return of said member to its normal position, means operative to unlatch the carrier upon its arrival at coin-discharge position, a rocker mounted on the coin carrier, said rocker having a portion adapted to enter the coin-receiving pocket laterally in such manner as to contact the side of an unperforated coin therein or, in the absence of such a coin, to extend farther into or across the said pocket, a spring biasing said rocker in the direction to withdraw said portion thereof from the pocket, means carried by said rotary member and effective upon rotation of the latter to rotate the rocker in the direction tending to cause said portion to enter the coin pocket, a protuberance on the rotary member engageable by the rocker upon rotation of the rotary member and thus effective to restrict rotation of the rotary member to less than the aforementioned predetermined distance except when said rocker portion is prevented from fully entering said pocket as by the presence therein of a proper coin, said protuberance being ineffective upon the rocker and thus incapable of restricting rotation of the rotary member whenever a proper coin is in the pocket.

2. The combination in a coin-controlled device, of a rotary coin carrier having a coin-receiving pocket and a peripheral opening leading into said pocket, said carrier having a normal coin-receiving rotative position, and an alternate coin-discharge rotative position, means biasing said carrier toward its normal rotative position, driving means operative to rotate the carrier from normal to alternate position, and mechanism for disabling said driving means whereby to prevent rotation of the carrier thereby in the absence of a coin or imperforate slug in said pocket, said disabling mechanism including a movable element having a finger portion movable laterally of the pocket with movement of the element and adapted to enter the same to a predetermined extent except when obstructed by a coin or the like in the pocket, spring means normally biasing said element to position the finger portion out of said pocket, means operating in response to a movement of said driving means for moving the element to move said finger portion in a direction to enter said pocket, a stop portion on the element and movable therewith into a position to limit the movement of said driving means that the latter is ineffective to rotate the carrier when said finger portion has entered said pocket to said predetermined extent, said stop portion, when the finger portion is obstructed by a coin or the like from entering said pocket said predetermined extent, being movable with the element to a position in which it is ineffective to so limit the movement of said driving means.

3. The combination in a coin-controlled device, of a coin carrier having a coin-receiving pocket and rotatable in a predetermined direction from a normal coin-receiving position to an alternate coin-discharge position, means biasing the carrier toward its normal position, a rotary member co-axial with the carrier, a spring biasing the rotary member toward a normal rotative position, said member being manually rotatable in a direction opposite to said predetermined direction to an alternate rotative position wherein it is operative to drivably engage the carrier to effect rotation of the carrier from normal to alternate position as the rotary member returns to normal rotative position under the power of its biasing spring, an element having a first portion movable toward and into said pocket in response to a partial rotation of said member toward said alternate position and a second portion movable to a position in which said second portion is effective to block complete rotation of said member to its alternate rotative position whenever the movement of the element is not restricted by contact of the first portion with a coin or the like in the pocket, said first portion being adapted, when moved in response to a partial rotation of said member, to contact a coin, if any, in the coin carrier pocket and to limit movement of the element so that the second portion is ineffective to block completion of the rotation of said member from normal to alternate position.

4. The combination in a coin-controlled device, of a coin carrier rotatable in a predetermined direction from a normal coin-receiving position to an alternate coin-discharge position, means biasing the carrier toward its normal position, a rotary member co-axial with the carrier, a spring biasing the rotary member toward a normal rotative position, said member being manually rotatable in a direction opposite to said predetermined direction to an alternate rotative position wherein it is operative to drivably engage the carrier to effect rotation of the carrier from normal to alternate position as the rotary member returns to normal rotative position under the power of its biasing spring, a rocker element having a spring-held normal position from which it is rotatable to a second position in response to a partial rotation of the rotary member, said rocker element having a first portion and a second portion with the second portion being effective when the element is in its second position to block the rotary member and thus prevent completion of the rotation thereof from normal to alternate position, said first portion being adapted upon rotation of the element toward its second position to contact a coin, if any, in the coin carrier and thus to limit rotation of the element so that the second portion is ineffective to block completion of the rotation of the rotary member from normal to alternate position.

5. The combination according to claim 4 including spring means for actuating the rocker element in response to the specified partial rotation of the rotary member, said spring means being effective because of its yieldability to prevent excessive restraint of the rotary member and excessive pressure on the rocker element as a result of the latter being obstructed by a coin or the like in the carrier.

6. The combination in a coin-controlled device, of a coin carrier rotatable from a normal coin-receiving position to an alternate coin-discharge position, means biasing the carrier toward its normal position, a rotary power plate co-axial with the carrier and positioned adjacent thereto, a spring biasing the rotary power plate toward a normal rotative position, said power plate being manually rotatable, in a direction opposite to the direction of rotation of the coin carrier from coin-receiving to coin-discharge position, to an alternate rotative position and returnable to its normal position by its biasing spring, said plate being operative upon arrival at its alternate position to drivably engage the carrier whereby to effect rotation of the carrier from normal to alternate position during the subsequent return of the plate to its normal position, a rocker element fulcrumed on the carrier at the side thereof adjacent the power plate, said rocker element being spring-biased toward a first position which it normally assumes and from which it is rotatable to a second position in response to a partial rotation of the power plate away from normal position, said rocker element having a first portion and a second portion with the second portion being effective when the element is in its second position to block the power plate and thus prevent it reaching its alternate position, said first portion being adapted upon rotation of the element toward its second position to contact a coin, if any, in the coin carrier and thus to limit rotation of the element so that the second portion is ineffective to block completion of the rotation of the power plate from normal to alternate position.

7. The combination according to claim 6 wherein the rocker element is interposed between the carrier and the power plate and fulcrumed on the carrier, said combination further including a leaf spring attached to the power plate and movable therewith and adapted to yieldably engage the rocker element and rotate the same toward its second position in response to rotation of the power plate.

8. The combination according to claim 6, including a latch carried by the power plate and a roller attached to the carrier and adapted to be drivably engaged by the latch upon arrival of the power plate at its alternate position.

9. The combination in a coin-controlled device, of a rotary coin carrier having a normal coin-receiving position and an alternate coin-discharge position, manually controlled power mechanism including a rotary member having a normal rotative position and an alternate rotative position, a spring biasing said rotary member toward its normal angular position, manually actuable means for rotating said member from normal to alternate position, latch means operative to drivably couple the carrier to the rotary member when the latter reaches its alternate position and effective to enable the rotary member to rotate the carrier from normal to alternate position upon subsequent rotation of the rotary member from its alternate position to its normal position, and a lock effective to prevent rotation of the carrier independently of the power mechanism, said rotary member being operative immediately before arriving at its alternate position, but not otherwise, to deactuate said lock and thereby release the carrier.

10. The combination in a coin-controlled device, of a rotary coin carrier having a normal coin-receiving position and an alternate coin-discharge position, manually controlled power mechanism including a rotary plate having a normal rotative position and an alternate rotative position, said plate being co-axial with and adjacent the carrier, a spring biasing said plate toward its normal rotative position, manually actuable means for rotating said plate from normal to alternate position, latch means operative to drivably couple the carrier to the rotary plate when the latter reaches its alternate position and effective to enable the plate to rotate the carrier from normal to alternate position upon subsequent rotation of the plate from its alternate position to its normal position, and a lock effective to prevent rotation of the carrier independently of the power mechanism, said plate including a cam portion which is operative upon said lock to deactuate the same immediately prior to arrival of the plate at its alternate posture, but not otherwise, the arrangement being such that the carrier remains locked until just an instant before the plate commences its return movement.

11. The combination in a coin-controlled device, of a rotary coin carrier having a normal coin-receiving position and an alternate coil-discharge position, manually controlled power mechanism including a rotary plate co-axial with the carrier and having a normal rotative position and an alternate rotative position, a spring biasing said plate toward its normal rotative position, manually actuable means for rotating said plate from normal to alternate position and operative to abruptly release said plate upon arrival thereof at its alternate position, latch means operative to drivably couple the carrier to the rotary plate when the latter reaches its alternate position and effective to enable the plate to rotate the carrier from normal to alternate position upon subsequent rotation of the plate from its alternate position to its normal position, a rotary lock member normally in locking engagement with the carrier and effective to prevent rotation of the carrier independently of the power mechanism, said plate including a peripheral cam portion which is operative to rotate said lock member and thus release the carrier immediately prior to arrival of the plate at its alternate position, but not otherwise, the arrangement being such that the carrier remains locked until just before the plate is released by the manually actuable means.

12. The combination of claim 11 including a trouble flag connected to the lock member and movable thereby into a trouble-indicating position upon rotation of the lock member by the said cam portion, said trouble flag being adapted to be held in trouble-indicating position by said cam portion until the plate has partially completed its return movement, a function of the trouble flag being to indicate a failure of the plate to return.

13. The combination of claim 11 including a trouble flag connected to the lock member and movable thereby into a trouble-indicating position upon rotation of the lock member by the said cam portion, said carrier having a peripheral surface which operates as a support for the lock member after the carrier is unlocked and thus serves to hold the trouble flag in trouble-indicating position while the carrier remains out of its normal position, a function of the trouble flag being to indicate a failure of the carrier to return to normal position.

14. The combination in a coin-controlled device, of a rotary coin carrier having a normal coin-receiving position and an alternate coin-discharge position, means for rotating said carrier from normal to alternate position, a trouble flag movable by said means to a trouble-indicating position, said carrier being operative to retain the trouble flag in trouble-indicating position while the carrier remains out of normal position, a function of the trouble flag being to indicate a failure of the carrier to return to its normal position.

15. The combination in a parking meter, of a rotary coin carrier having a normal coin-receiving position and an alternate coin-discharge position, a power mechanism including a rotary plate co-axial with the carrier, said plate having a normal rotative position and an alternate rotative position, a spring biasing the plate toward its normal rotative position, a hinged push plate having a coin slot in registration with a coin-receiving pocket in the coin carrier, a roller attached to said plate and movable in an arcuate path upon rotation of the plate, a pusher link pivotally connected at one end to the push plate and operative upon depression of the push plate to drivably engage said roller and thereby effect rotation of said plate from normal to alternate position, a protuberance on said plate operative to engage the pusher link and move the same out of driving engagement with the roller whereby to release the plate when it reaches its alternative position, a latch operative to drivably couple the carrier to the rotary plate when the latter reaches its alternate position, means for unlatching the carrier plate upon arrival of the latter at its alternate position, a spring for restoring the carrier to its normal position, a lock member normally latching the carrier against rotation out of its normal position, a cam portion on said plate operative to unlatch the carrier just prior to release of the plate and after said latch is in position to drivably couple the carrier to the plate, and a trouble flag carried by said lock member and movable therewith by said cam portion, said carrier having a peripheral surface which serves to support said lock member in the unlatched position while the carrier remains away from its normal position, said trouble flag occupying a trouble-indicating position while the lock member remains out of the position in which it is effective to latch the carrier, said trouble flag serving to indicate trouble whenever either the plate or the carrier fails to return to normal position.

ROBERT F. BROUSSARD.
HENRY J. MILLER.
LESTER D. SOLLENBERGER.
SHERMAN L. CHRISTENSEN.

References Cited in the file of this patent

UNITED STATES PATENTS

| Number | Name | Date |
|---|---|---|
| 677,974 | Gibbs | July 9, 1901 |
| 854,097 | Mackeown | May 21, 1907 |
| 957,720 | Starr | May 10, 1910 |
| 984,223 | Jones | Feb. 14, 1911 |
| 1,252,036 | Rydquist | Jan. 1, 1918 |
| 2,058,700 | Leis | Oct. 27, 1936 |